United States Patent
Lee

(10) Patent No.: US 9,258,502 B2
(45) Date of Patent: Feb. 9, 2016

(54) METHODS OF OPERATING DEPTH PIXEL INCLUDED IN THREE-DIMENSIONAL IMAGE SENSOR AND METHODS OF OPERATING THREE-DIMENSIONAL IMAGE SENSOR

(71) Applicant: Samsung Electronics Co., Ltd., Suwon-si (KR)

(72) Inventor: Tae-Yon Lee, Hwarang-ro (KR)

(73) Assignee: Samsung Electronics Co., Ltd. (KR)

( * ) Notice: Subject to any disclaimer, the term of this patent is extended or adjusted under 35 U.S.C. 154(b) by 236 days.

(21) Appl. No.: 14/105,258

(22) Filed: Dec. 13, 2013

(65) Prior Publication Data

US 2014/0166858 A1  Jun. 19, 2014

(30) Foreign Application Priority Data

Dec. 17, 2012 (KR) .................. 10-2012-0147038

(51) Int. Cl.
| | |
|---|---|
| *H04N 5/3745* | (2011.01) |
| *H04N 5/369* | (2011.01) |
| *G01S 17/89* | (2006.01) |
| *G01S 7/486* | (2006.01) |

(52) U.S. Cl.
CPC .......... *H04N 5/37452* (2013.01); *G01S 7/4863* (2013.01); *G01S 7/4865* (2013.01); *G01S 17/89* (2013.01); *H04N 5/3696* (2013.01)

(58) Field of Classification Search
CPC ..... G01S 17/89; G01S 7/4863; G01S 7/4865; H04N 5/3696; H04N 5/37452
See application file for complete search history.

(56) References Cited

U.S. PATENT DOCUMENTS

| | | | |
|---|---|---|---|
| 7,626,685 B2 | 12/2009 | Jin et al. | |
| 7,671,391 B2 | 3/2010 | Kawahito | |
| 2005/0109917 A1 | 5/2005 | Wong | |
| 2010/0231891 A1 | 9/2010 | Mase et al. | |
| 2011/0019049 A1 | 1/2011 | Jin et al. | |
| 2012/0134598 A1* | 5/2012 | Ovsiannikov | G01S 17/89 382/217 |
| 2012/0249740 A1* | 10/2012 | Lee | H04N 13/0207 348/46 |

FOREIGN PATENT DOCUMENTS

| | | |
|---|---|---|
| JP | 2006-148284 | 6/2006 |
| JP | 2010-177594 | 8/2010 |
| JP | 2010-197227 | 9/2010 |
| KR | 1020110052910 A | 5/2011 |

\* cited by examiner

*Primary Examiner* — Francis M Legasse, Jr.

(74) *Attorney, Agent, or Firm* — Myers Bigel Sibley & Sajovec, P.A.

(57) ABSTRACT

In a method of operating a depth pixel included in a three-dimensional (3D) image sensor, a plurality of sampling values are obtained by sampling a reception light reflected by an object based on a transfer control signal having a first initial activation level. The depth pixel includes a photo detection region, a transfer gate and a floating diffusion region. The transfer control signal is applied to the transfer gate. A first final activation level of the transfer control signal is determined based on the plurality of sampling values and at least one reference value. A distance between the depth pixel and the object is calculated based on the reception light and the transfer control signal having the first final activation level.

20 Claims, 24 Drawing Sheets

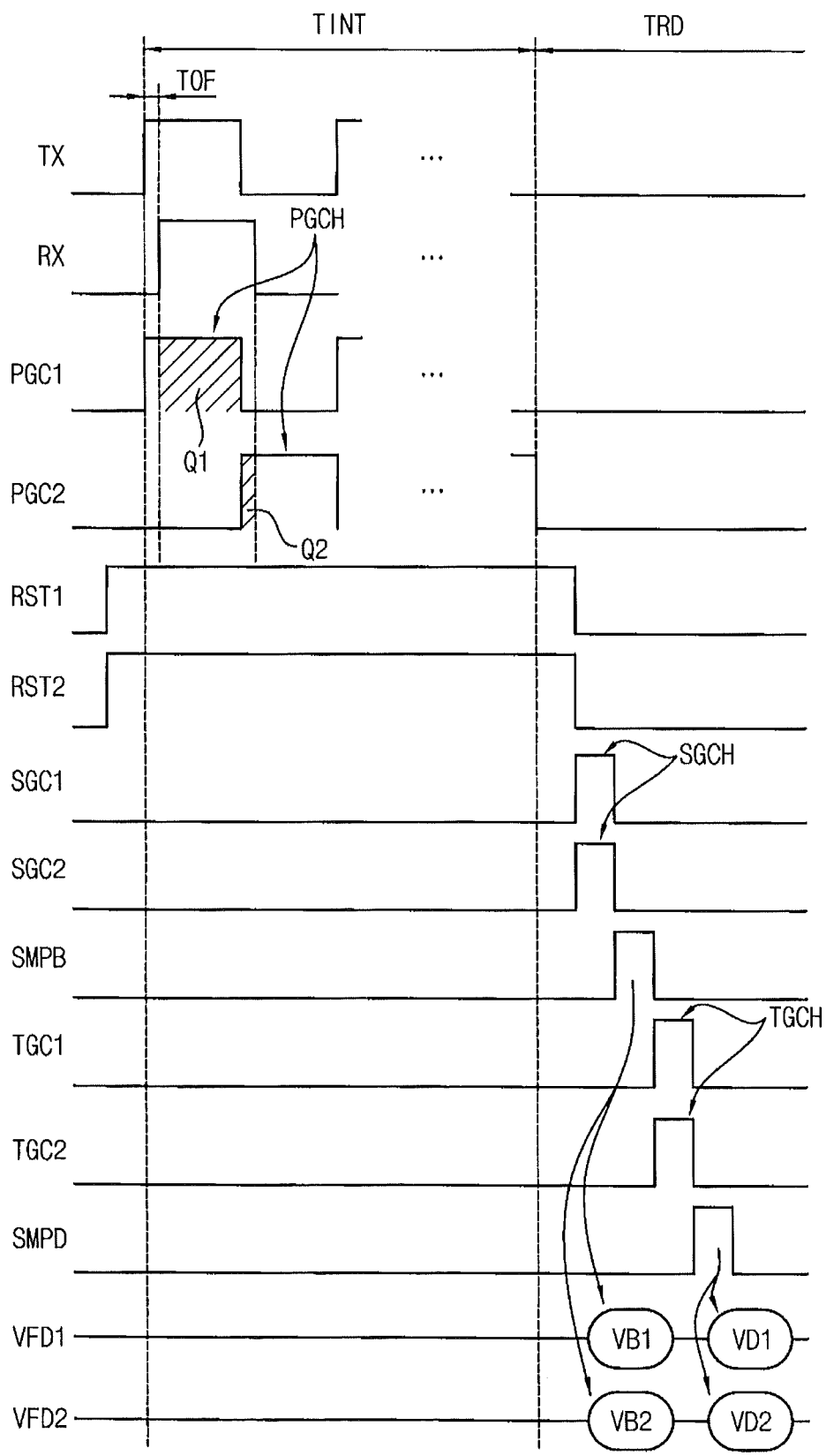

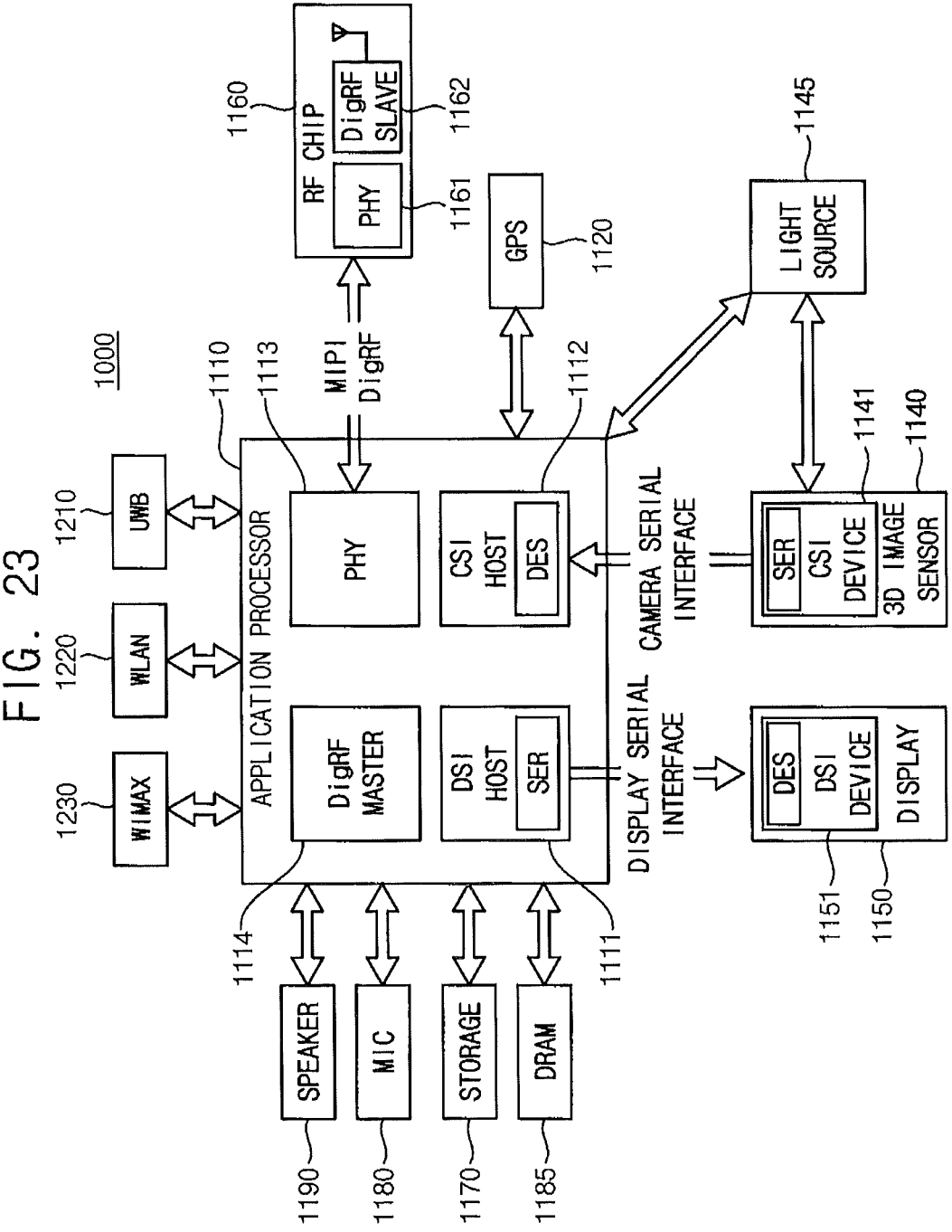

METHODS OF OPERATING DEPTH PIXEL INCLUDED IN THREE-DIMENSIONAL IMAGE SENSOR AND METHODS OF OPERATING THREE-DIMENSIONAL IMAGE SENSOR

CROSS-REFERENCE TO RELATED APPLICATION

This application claims priority under 35 USC §119 to Korean Patent Application No. 2012-0147038, filed on Dec. 17, 2012 in the Korean Intellectual Property Office (KIPO), the contents of which are herein incorporated by reference in their entirety.

BACKGROUND

An image sensor is a semiconductor device that transforms a light signal input from outside to an electric signal (i.e., performs photoelectric transformations) to provide image information corresponding to the light signal. Recently, a three-dimensional (3D) image sensor that provides distance information as well as the image information based on the light signal has been suggested. Typically, the 3D image sensor may measure a distance between each unit pixel and an object by measuring a time of flight (TOF) that corresponds to an elapsed time during which an optical pulse (i.e., a laser pulse) is emitted toward the object by a light source, and then input to the unit pixel after being reflected by the object.

SUMMARY

Accordingly, the inventive concept is provided to substantially obviate one or more problems due to limitations and disadvantages of the related art.

Some example embodiments provide a method of operating a depth pixel included in a three-dimensional (3D) image sensor capable of precisely measuring a distance between the depth pixel and an object even if an intensity of light reflected by the object increases.

Some example embodiments provide a method of operating a three-dimensional (3D) image sensor capable of precisely measuring a distance between depth pixels in the 3D image sensor and an object even if an intensity of light reflected by the object increases.

According to example embodiments, in a method of operating a depth pixel included in a three-dimensional (3D) image sensor, a plurality of sampling values are obtained by sampling a reception light reflected by an object based on a transfer control signal having a first initial activation level. The depth pixel includes a photo detection region, a transfer gate and a floating diffusion region. The transfer control signal is applied to the transfer gate. A first final activation level of the transfer control signal is determined based on the plurality of sampling values and at least one reference value. A distance between the depth pixel and the object is calculated based on the reception light and the transfer control signal having the first final activation level.

In the determining the first final activation level of the transfer control signal, a maximum sampling value of the plurality of sampling values may be selected. The first final activation level of the transfer control signal may be selected by comparing the maximum sampling value with the at least one reference value.

In an example embodiment, the at least one reference value may include a first reference value and a second reference value. In the selecting the first final activation level of the transfer control signal includes, when the maximum sampling value is less than the first reference value, a first voltage level may be selected as the first final activation level. When the maximum sampling value is equal to or greater than the first reference value and is less than the second reference value, a second voltage level may be selected as the first final activation level. When the maximum sampling value is equal to or greater than the second reference value, a third voltage level may be selected as the first final activation level.

The second voltage level may be less than the first voltage level and may be greater than the third voltage level.

In an example embodiment, the at least one reference value may include a first reference value and a second reference value. In the selecting the first final activation level of the transfer control signal, when the maximum sampling value is less than the first reference value, a first voltage level may be selected as the first final activation level. When the maximum sampling value is equal to or greater than the first reference value, the maximum sampling value may be updated based on a second voltage level. When the updated maximum sampling value is less than the second reference value, the second voltage level may be selected as the first final activation level. When the updated maximum sampling value is equal to or greater than the second reference value, a third voltage level may be selected as the first final activation level.

The depth pixel may further include a photo gate formed over the photo detection region. A photo control signal being applied to the photo gate. The plurality of sampling values may be obtained by sampling the reception light based on the transfer control signal having the first initial activation level and the photo control signal having a second initial activation level. A second final activation level of the photo control signal may be determined based on the plurality of sampling values and the at least one reference value. The distance between the depth pixel and the object may be calculated based on the reception light, the transfer control signal having the first final activation level and the photo control signal having the second final activation level.

In the determining the second final activation level of the photo control signal, a maximum sampling value of the plurality of sampling values may be selected. The second final activation level of the photo control signal may be selected by comparing the maximum sampling value with the at least one reference value.

In an example embodiment, the at least one reference value may include a first reference value and a second reference value. In the selecting the second final activation level of the photo control signal, when the maximum sampling value is less than the first reference value, a first voltage level may be selected as the second final activation level. When the maximum sampling value is equal to or greater than the first reference value and is less than the second reference value, a second voltage level may be selected as the second final activation level. When the maximum sampling value is equal to or greater than the second reference value, a third voltage level may be selected as the second final activation level.

The second voltage level may be greater than the first voltage level and may be less than the third voltage level.

In an example embodiment, the at least one reference value may include a first reference value and a second reference value. In the selecting the second final activation level of the photo control signal, when the maximum sampling value is less than the first reference value, a first voltage level may be selected as the second final activation level. When the maximum sampling value is equal to or greater than the first reference value, the maximum sampling value may be updated based on a second voltage level. When the updated maximum sampling value is less than the second reference value, the second voltage level may be selected as the second final activation level. When the updated maximum sampling value is equal to or greater than the second reference value, a third voltage level may be selected as the second final activation level.

The depth pixel may further include a bridge diffusion node formed adjacent the photo detection region.

The depth pixel may further include a storage node and a storage gate. The storage node may be formed between the photo detection region and the floating diffusion region. The storage gate may be formed between the photo gate and the transfer gate. A storage control may be being applied to the storage gate. The plurality of sampling values may be obtained by sampling the reception light based on the transfer control signal having the first initial activation level, the photo control signal having the second initial activation level and the storage control signal having a third initial activation level. A third final activation level of the storage control signal may be determined based on the plurality of sampling values and the at least one reference value. The distance between the depth pixel and the object may be calculated based on the reception light, the transfer control signal having the first final activation level, the photo control signal having the second final activation level and the storage control signal having the third final activation level.

In the determining the third final activation level of the storage control signal, a maximum sampling value of the plurality of sampling values may be selected. The third final activation level of the storage control signal may be selected by comparing the maximum sampling value with the at least one reference value.

In an example embodiment, the at least one reference value may include a first reference value and a second reference value. In the selecting the third final activation level of the storage control signal, when the maximum sampling value is less than the first reference value, a first voltage level may be selected as the third final activation level. When the maximum sampling value is equal to or greater than the first reference value and is less than the second reference value, a second voltage level may be selected as the third final activation level. When the maximum sampling value is equal to or greater than the second reference value, a third voltage level may be selected as the third final activation level.

According to example embodiments, in a method of operating a three-dimensional (3D) image sensor including a plurality of depth pixels, a first distance between a first depth pixel of the plurality of depth pixels and an object is obtained based on a reception light reflected by the object. A second distance between a second depth pixel of the plurality of depth pixels and the object is obtained based on the reception light. A 3D image is generated based on the first distance and the second distance. The first depth pixel includes a first photo detection region, a first transfer gate and a first floating diffusion region. In the obtaining the first distance, a plurality of sampling values are obtained by sampling the reception light based on a first transfer control signal having a first initial activation level, the first transfer control signal being applied to the first transfer gate. A first final activation level of the first transfer control signal is determined based on the plurality of sampling values and at least one reference value. The first distance is calculated based on the reception light and the first transfer control signal having the first final activation level.

Accordingly, in the method of operating the depth pixel included in the 3D image sensor and in the method of operating the 3D image sensor, the activation levels of the control signals applied to the transfer gate, the photo gate and/or the storage gate may be controlled (e.g., as the intensity of the reception light increases, the activation level of the transfer control signal may increase, the activation level of the photo control signal may decreases, and/or the activation level of the storage control signal may decrease) depending on the intensity of the reception light reflected by the object. Therefore, the distance between the depth pixel and the object may be precisely measured without additional ambient light cancellation circuits and/or schemes, even if the intensity of the reception light increases.

BRIEF DESCRIPTION OF THE DRAWINGS

Illustrative, non-limiting example embodiments will be more clearly understood from the following detailed description taken in conjunction with the accompanying drawings.

FIGS. 18A, 18B, 19A and 19B are diagrams for describing an operation of the depth pixel of FIG. 16 based on the method of FIGS. 15 and 17.

FIG. 23 is a block diagram illustrating an example of an interface used for the computing system of FIG. 22.

DETAILED DESCRIPTION

Figure 1:
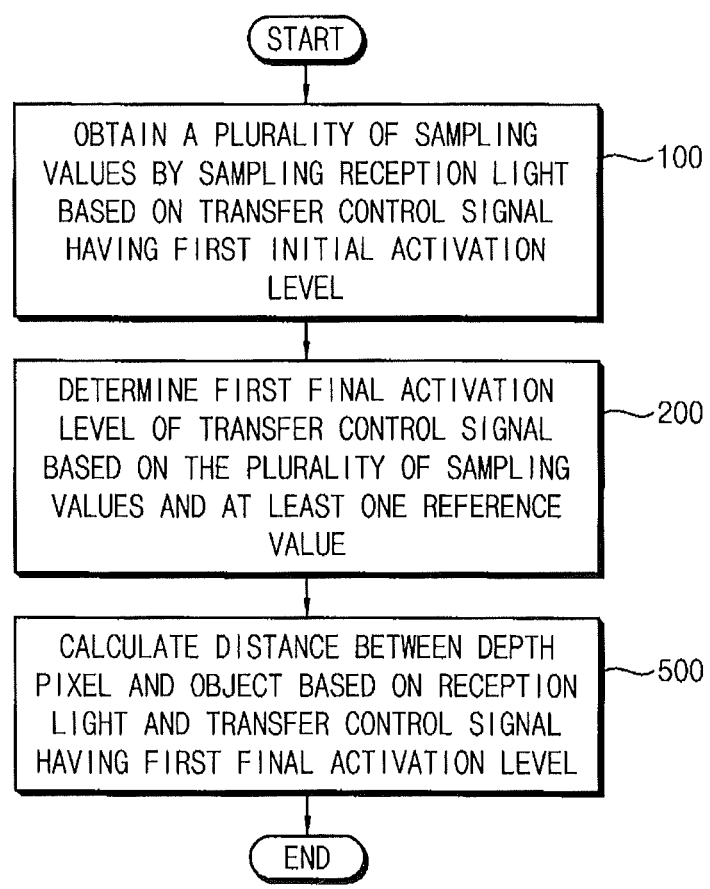
FIG. 1 is a flow chart illustrating methods of operating a depth pixel included in a three-dimensional (3D) image sensor according to some embodiments of the present inventive concept.

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating operations for methods of operating a depth pixel included in a three-dimensional (3D) image sensor according to some embodiments of the present inventive concept.

The method of FIG. 1 may be applied in a depth pixel that is included in a 3D image sensor and includes a photo detection region, a transfer gate and a floating diffusion region.

Referring to FIG. 1, in the methods of operating the depth pixel according to some embodiments, a plurality of sampling values are obtained by sampling a reception light reflected by an object based on a transfer control signal having a first initial activation level (block 100). The reception light may be generated based on a transmission light such that the object is illuminated with the transmission light. The transfer control signal may be applied to the transfer gate. Photo charges that are generated in the photo detection region by the reception light may be transferred to the floating diffusion region through a channel that is formed in response to the transfer control signal. The plurality of sampling values may correspond to an intensity of the reception light.

A first final activation level of the transfer control signal is determined based on the plurality of sampling values and at least one reference value (block 200). A distance between the depth pixel and the object is calculated based on the reception light and the transfer control signal having the first final activation level (block 500).

As used herein, the term "activation level" of one signal may indicate a voltage level of the signal at a moment when the signal has a logic high state, if the signal is toggled between a logic low state and the logic high state.

Figure 2:
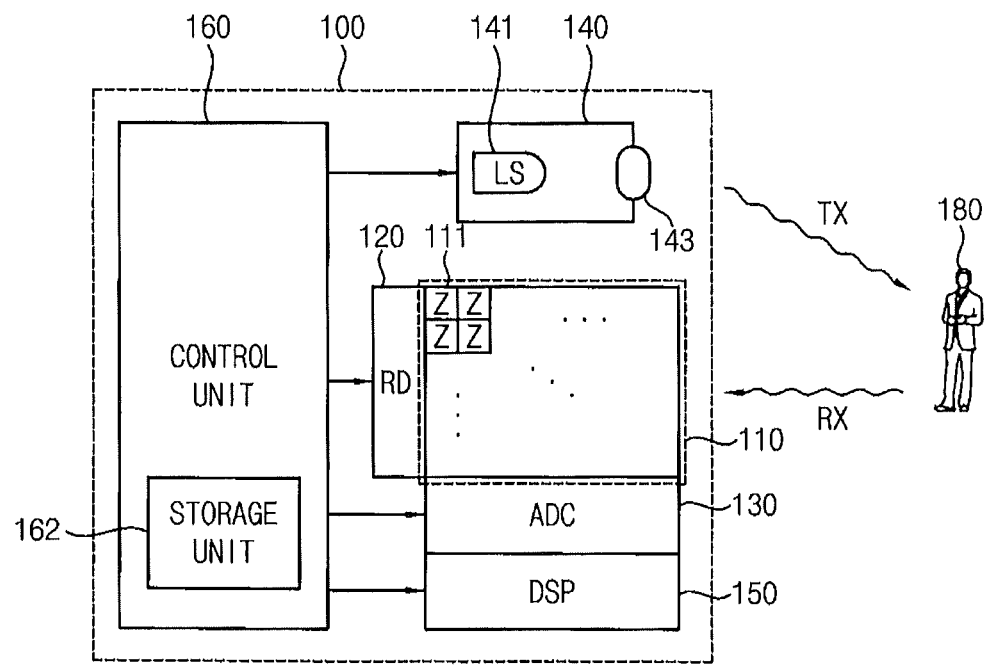
FIG. 2 is a block diagram illustrating a 3D image sensor according to some embodiments of the present inventive concept.

FIG. 2 is a block diagram illustrating a 3D image sensor according to some embodiments.

Referring to FIG. 2, a 3D image sensor 100 includes a pixel array 110, a row driving unit 120, an analog-to-digital conversion (ADC) unit 130, a light source module 140, a digital signal processing (DSP) unit 150 and a control unit 160.

The light source module 140 emits a transmission light TX having a predetermined wavelength. For example, the light source module 140 may emit infrared light or near-infrared light. The light source module 140 may include a light source 141 and a lens 143, and may further include a filter (not illustrated). The light source 141 may be controlled by the control unit 160 to output the transmission light TX such that the intensity of the transmission light TX periodically changes. For example, the intensity of the transmission light TX may be modulated to have a waveform of a pulse wave, a sine wave, a cosine wave, or the like. The light source 141 may be implemented by a light emitting diode (LED), a laser diode, or the like. The transmission light TX generated by the light source 141 may be focused on an object 180 by the lens 143 and may be filtered by the filter.

The pixel array 110 includes a plurality of depth pixels 111. The plurality of depth pixels 111 may receive a reception light RX that is reflected from the object 180 after being emitted to the object 180 by the light source module 140, may convert the reception light RX into electrical signals, and may provide information about a distance (or a depth) of the object 180 from the 3D image sensor 100 (i.e. depth information). For example, the reception light RX may be generated based on infrared light or near-infrared light emitted by the light source module 140, and/or based on infrared light, near-infrared light or visible light included in ambient light. In other words, the 3D image sensor may use infrared light or near-infrared light emitted by the light source module 140, and/or infrared light, near-infrared light or visible light included in ambient light to generate the depth information.

According to example embodiments, the pixel array 110 may further include a plurality of color pixels (not illustrated) for providing color image information. In this case, the 3D image sensor 100 may be a 3D color image sensor that provides the color image information and the depth information.

The row driving unit 120 is connected with each row of the pixel array 110. The row driving unit 120 may generate driving signals to drive each row.

The ADC unit 130 is connected with each column of the pixel array 110. The ADC unit 130 may convert analog signals output from the pixel array 110 into digital signals. In some example embodiments, the ADC unit 130 may perform a column analog-to-digital conversion that converts analog signals in parallel using a plurality of analog-to-digital converters respectively coupled to a plurality of column lines. In other example embodiments, the ADC unit 130 may perform a single analog-to-digital conversion that sequentially converts the analog signals using a single analog-to-digital converter.

According to example embodiments, the ADC unit 130 may further include a correlated double sampling (CDS) unit for extracting an effective signal component. In some example embodiments, the CDS unit may perform an analog double sampling that extracts the effective signal component based on a difference between an analog reset signal including a reset component and an analog data signal including a signal component. In other example embodiments, the CDS unit may perform a digital double sampling that converts the analog reset signal and the analog data signal into two digital signals and extracts the effective signal component based on a difference between the two digital signals. In still other example embodiments, the CDS unit may perform a dual correlated double sampling that performs both the analog double sampling and the digital double sampling.

The DSP unit 150 receives the digital signals output from the ADC unit 130, and performs image data processing on the digital signals. For example, the DSP unit 150 may perform image interpolation, color correction, white balance, gamma correction, color conversion, etc.

The control unit 160 controls the row driving unit 120, the ADC unit 130, the light source module 140 and the DSP unit 150 by providing control signals, such as a clock signal, a timing control signal, or the like. According to example embodiments, the control unit 160 may include a control logic circuit, a phase locked loop circuit, a timing control circuit, a communication interface circuit, or the like.

In some embodiments, the control unit 160 may include a storage unit 162. The storage unit 162 may store the at least one reference value and may store activation levels TGCH, PGCH, SGCH of control signals (e.g., a transfer control signal, a photo control signal and a storage control signal) that are changed based on the method of operating the depth pixel according to example embodiments. For example, the storage unit 162 may include at least one volatile memory device such as a dynamic random access memory (DRAM) device, a static random access memory (SRAM) device, a mobile DRAM device, etc., and/or at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. According to some embodiments, the storage unit 162 may be located outside the control unit 160 or may be located outside the 3D image sensor 100.

Figure 3:
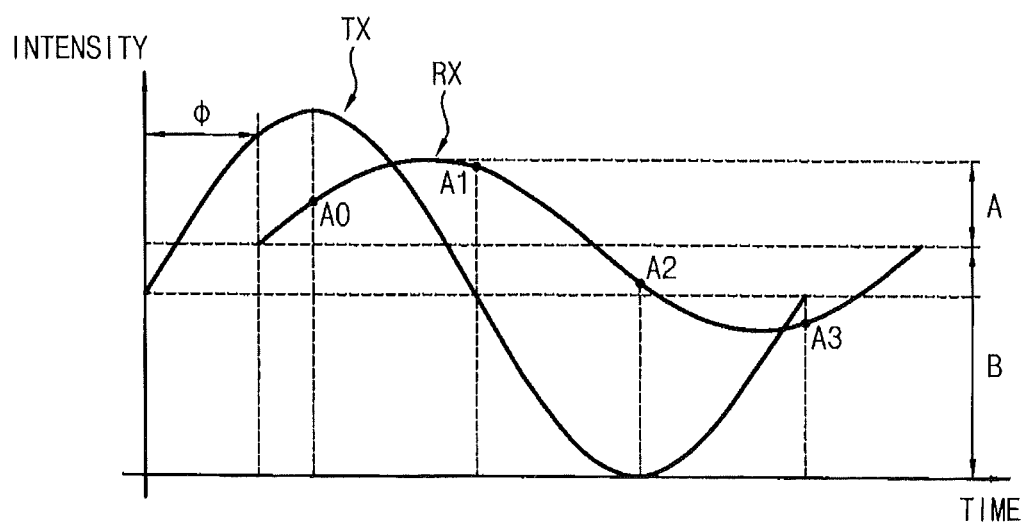
FIG. 3 is a diagram for describing an operation of obtaining depth information about an object in the 3D image sensor of FIG. 2.

FIG. 3 is a diagram for describing an operation of obtaining depth information about an object in the 3D image sensor of FIG. 2.

Referring to FIGS. 2 and 3, the transmission light TX emitted by the light source module 140 may have a periodic intensity and/or characteristic. For example, the intensity (e.g., the number of photons per unit area) of the transmission light TX may have a waveform of a sine wave.

The transmission light TX may be reflected by the object 180, and then may be incident on the pixel array 110 as the reception light RX. The pixel array 110 may periodically sample the reception light RX. According to some embodiments, during each period of the reception light RX (e.g., corresponding to a period of the transmission light TX), the pixel array 100 may perform sampling operations on the reception light RX by sampling, e.g., at two sampling points having a phase difference of about 180 degrees, at four sampling points having a phase difference of about 90 degrees, or at more than four sampling points. For example, four sampling values A0, A1, A2 and A3 of the reception light RX may be obtained at phases of about 90 degrees, about 180 degrees, about 270 degrees and about 360 degrees per period, respectively.

The reception light RX may have an offset B that is different from an offset of the transmission light TX due to background light, a noise, or the like. The offset B of the reception light RX may be calculated by Equation 1.

$$B = \frac{A0 + A1 + A2 + A3}{4} \quad \text{[Equation 1]}$$

Here, A0 represents an intensity of the reception light RX sampled at a phase of about 90 degrees of the transmission light TX, A1 represents an intensity of the reception light RX sampled at a phase of about 180 degrees of the transmission light TX, A2 represents an intensity of the reception light RX sampled at a phase of about 270 degrees of the transmission light TX, and A3 represents an intensity of the reception light RX sampled at a phase of about 360 degrees of the transmission light TX.

The reception light RX may have an amplitude A lower than that of the transmission light TX due to loss (e.g., light loss). The amplitude A of the reception light RX may be calculated by Equation 2.

$$A = \frac{\sqrt{(A0 - A2)^2 + (A1 - A3)^2}}{2} \quad \text{[Equation 2]}$$

Black-and-white image information about the object 180, or the two-dimensional (2D) image may be provided by respective depth pixels 111 included in the pixel array 110 based on the amplitude A of the reception light RX.

The reception light RX may be delayed by a phase difference Φ corresponding, for example, to a double of the distance of the object 180 from the 3D image sensor 100 with respect to the transmission light TX. The phase difference Φ between the transmission light TX and the reception light RX may be calculated by Equation 3.

$$\phi = \arctan\left(\frac{A0 - A2}{A1 - A3}\right) \quad \text{[Equation 3]}$$

The phase difference Φ between the transmission light TX and the reception light RX may, for example, correspond to a time-of-flight (TOF). The distance of the object 180 from the 3D image sensor 100 may be calculated by an equation, "R=c*TOF/2", where R represents the distance of the object 180 from the 3D image sensor 100, and c represents the speed of light. Further, the distance of the object 180 from the 3D image sensor 100 may also be calculated by Equation 4 using the phase difference Φ between the transmission light TX and the reception light RX.

$$R = \frac{c}{4\pi f} \phi \quad \text{[Equation 4]}$$

Here, f represents a modulation frequency, which is a frequency of the intensity of the transmission light TX (or a frequency of the intensity of the reception light RX).

As described above, the 3D image sensor 100 according to some embodiments may obtain depth information about the object 180 using the transmission light TX emitted by the light source module 140. Although FIG. 3 illustrates the transmission light TX of which the intensity has a waveform of a sine wave, the 3D image sensor 100 may use the transmission light TX of which the intensity has various types of waveforms, according to some embodiments. Further, the 3D image sensor 100 may extract the depth information in various manners according to the waveform of the intensity of the transmission light TX, a structure of a depth pixel, or the like.

Figure 4:
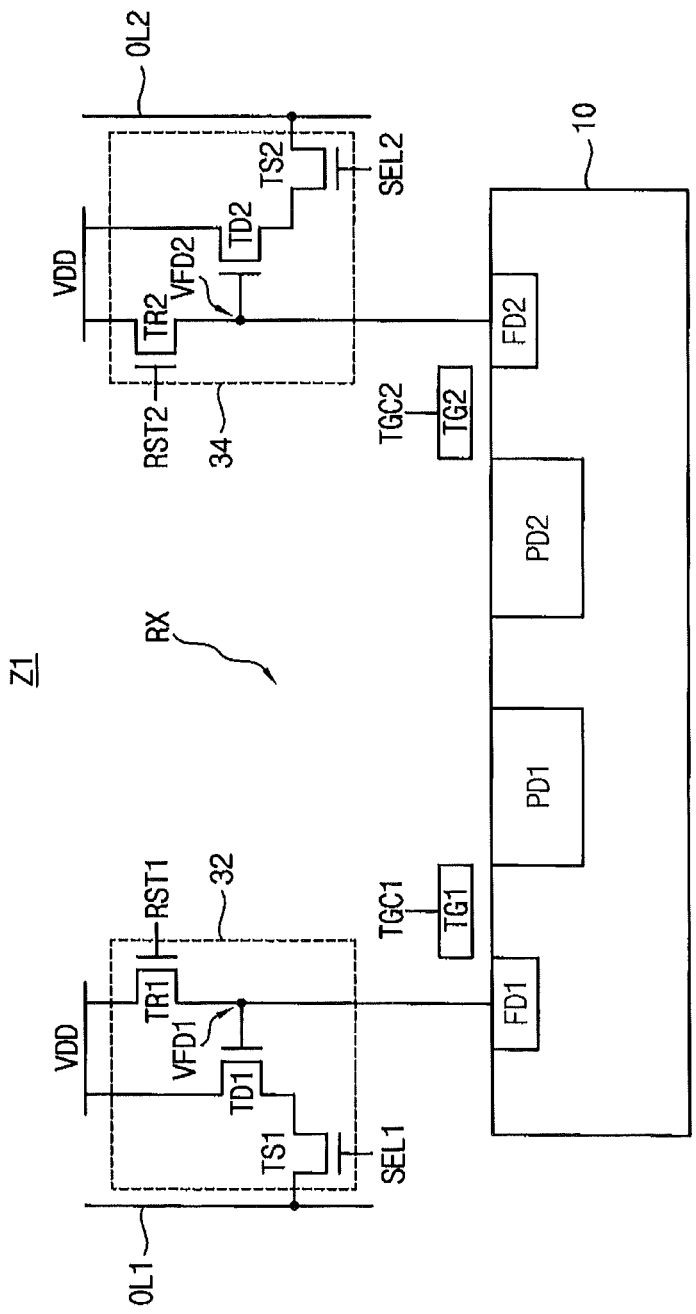
FIG. 4 is a cross-sectional view illustrating an example of a depth pixel included in the 3D image sensor of FIG. 2 and operating based on the methods of FIG. 1.

FIG. 4 is a cross-sectional view illustrating an example of a depth pixel included in the 3D image sensor of FIG. 2 and operating based on the methods of FIG. 1.

Referring to FIG. 4, a depth pixel Z1 includes a first photo detection region PD1, a second photo detection region PD2, a first floating diffusion region FD1 and a second floating diffusion region FD2, which are formed in a semiconductor substrate 10. The depth pixel Z1 includes a first transfer gate TG1, a second transfer gate TG2, a first output unit 32 and a second output unit 34, which are formed over the semiconductor substrate 10.

The depth pixel Z1 may be formed through the complementary metal-oxide-silicon (CMOS) processes based on the semiconductor substrate 10. For example, the photo detection regions PD1, PD2 and the floating diffusion regions FD1, FD2 may be formed using, e.g., an ion implantation process, or the like. The transfer gates TG1, TG2 may be formed over the semiconductor substrate 10 using a deposition process, an etch process, etc.

The photo-detection regions PD1, PD2 and the floating diffusion regions FD1, FD2 may be doped with impurities of an opposite conductivity type to that of the semiconductor substrate 10. For example, the photo-detection regions PD1, PD2 and the floating diffusion regions FD1, FD2 may be doped with impurities of the N-type when the semiconductor substrate 10 is the P-type. For another example, the photo-detection regions PD1, PD2 and the floating diffusion regions FD1, FD2 may be doped with impurities of the P-type when the semiconductor substrate 10 is the N-type or includes an N-type well.

The transfer gates TG1, TG2 may be formed between the photo detection regions PD1, PD2 and the floating diffusion regions FD1, FD2, respectively. The gates TG1, TG2 may include polysilicon or transparent conducting oxide (TCO). For example, the gates TG1, TG2 may include indium tin oxide (ITO), indium zinc oxide (IZO), zinc oxide (ZnO), titanium dioxide ($TiO_2$), etc.

Although not illustrated in FIG. 4, an insulation layer, such as an oxide layer, may be formed between the upper surface of the semiconductor substrate 10 and the gates TG1, TG2. In addition, although not illustrated in FIG. 4, a channel stop region may be formed in the semiconductor substrate 10 between the two photo detection regions PD1, PD2 to prevent charge transfer between the two photo detection regions PD1, PD2.

Photo charges that are generated in the photo detection regions PD1, PD2 by the reception light RX may be transferred to the floating diffusion regions FD1, FD2 in response to transfer control signals TGC1, TGC2, respectively. The floating diffusion regions FD1, FD2 may accumulate the photo charges transferred by the transfer gates TG1, TG2, respectively. The output units 32, 34 may output electrical signals corresponding to the photo charges accumulated in the floating diffusion regions FD1, FD2, respectively.

The first output unit 32 may include a first reset transistor TR1 for discharging the photo charges accumulated in the first floating diffusion region FD1 in response to a first reset signal RST1 and a power supply voltage VDD, a first drive transistor TD1 for amplifying a voltage VFD1 of the first floating diffusion region FD1, and a first select transistor TS1 for providing the voltage amplified by the first drive transistor TD1 to a first output line OL1 (e.g., a first column line). The second output unit 34 may include a second reset transistor TR2 for discharging the photo charges accumulated in the second floating diffusion region FD2 in response to a second reset signal RST2 and the power supply voltage VDD, a second drive transistor TD2 for amplifying a voltage VFD2 of the second floating diffusion region FD2, and a second select transistor TS2 for providing the voltage amplified by the second drive transistor TD2 to a second output line OL2 (e.g., a second column line).

Figure 5:
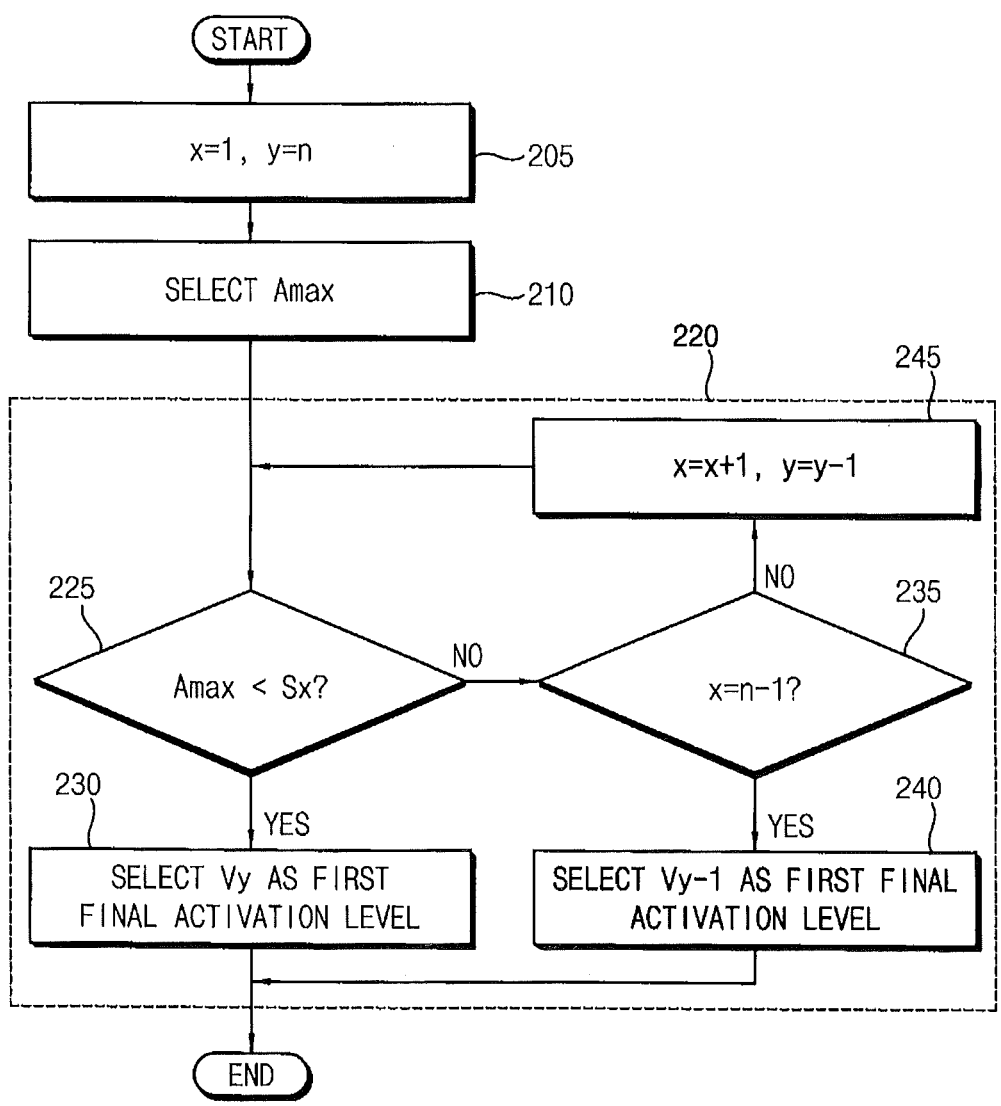
FIG. 5 is a flow chart illustrating an example of operation 200 in FIG. 1.
Figure 6A:
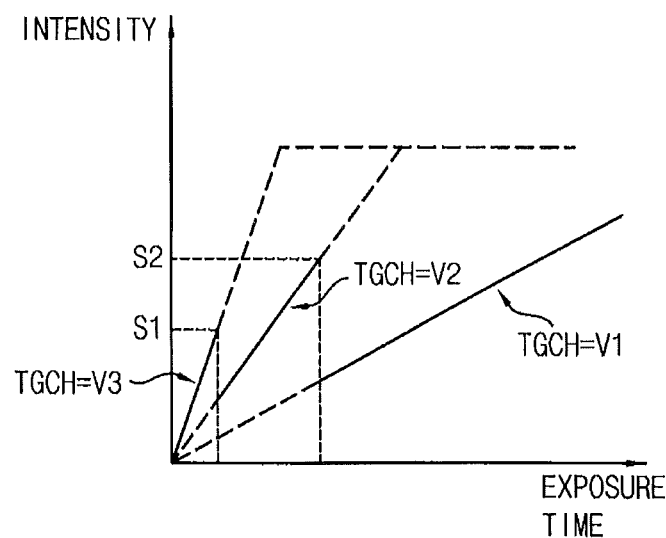
FIGS. 6A, 6B and 7 are diagrams for describing an operation of the depth pixel of FIG. 4 based on the method of FIGS. 1 and 5.
Figure 6B:
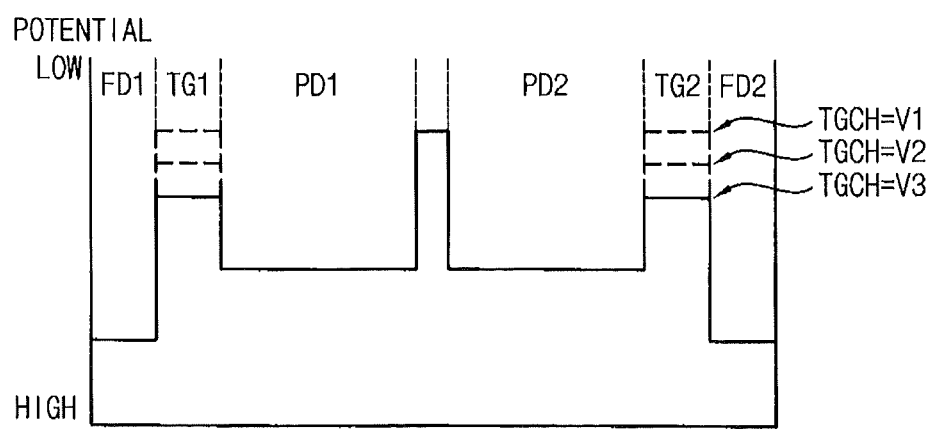
Figure 7:
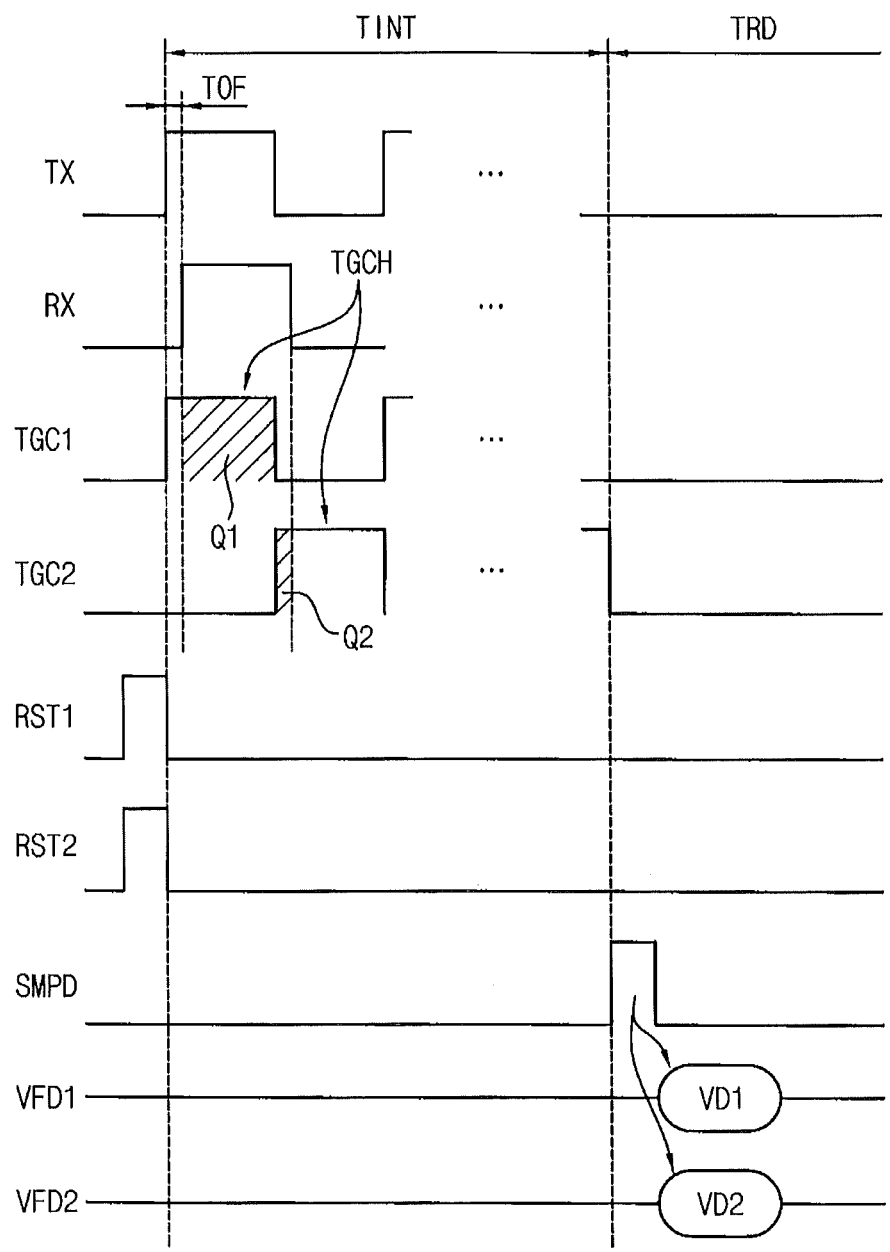

FIG. 5 is a flow chart illustrating an example of operations corresponding to block 200 in FIG. 1. FIGS. 6A, 6B and 7 are diagrams for describing an operation of the depth pixel of FIG. 4 based on the method of FIGS. 1 and 5.

Referring to FIGS. 1, 3, 4, 5, 6A, 6B and 7, in the block 200, variables may be initialized to correspond to the first initial activation level of the transfer control signals TGC1, TGC2 (block 205). For example, a variable x may be initialized as one, and a variable y may be initialized as n, where n is a natural number equal to or greater than two and corresponds to the changeable number of activation levels of the transfer control signals TGC1, TGC2.

A maximum sampling value Amax may be selected (block 210). The maximum sampling value Amax may be one of the plurality of sampling values that are obtained by the block 100 and may correspond a maximum intensity of the reception light RX. The first final activation level of the transfer control signals TGC1, TGC2 may be selected by comparing the maximum sampling value Amax with the at least one reference value (block 220).

More particularly, when the maximum sampling value Amax is less than a current reference value Sx (block 225: YES), a current voltage level Vy may be selected as the first final activation level of the transfer control signals TGC1, TGC2 (block 230). When the maximum sampling value Amax is equal to or greater than the current reference value Sx (block 225: NO), it is determined whether another reference value, which is used for comparing with the maximum sampling value Amax, exists (block 235). When another reference value exists (block 235: NO), the variables x and y may be changed (e.g., the variable x may increase by one, and the variable y may decrease by one) (block 245), and the above mentioned operations of blocks 225, 230, and 235 may be repeated based on the changed variables (e.g., based on another reference value). When another reference value does not exist (block 235: YES), a next voltage level Vy−1 may be selected as the first final activation level of the transfer control signals TGC1, TGC2 (block 240).

Hereinafter, methods of operating the depth pixel Z1 of FIG. 4 according to some embodiments will be described in detail, based on an example of using four sampling values A0, A1, A2, A3, two reference values S1, S2, and three changeable activation levels V1, V2, V3.

In an initial operation time, the first initial activation level of the transfer control signals TGC1, TGC2 may correspond to the first voltage level V3. As illustrated in FIG. 3, four sampling values A0, A1, A2, A3 may be obtained by sampling the reception light RX based on the transfer control signals TGC1, TGC2 having the first initial activation level (e.g., V3). The value A1 may be selected as the maximum sampling value Amax and may be compared with two reference values S1, S2 illustrated in FIG. 6A. Although FIG. 3 illustrates that the value A1 is the maximum sampling value Amax, the maximum sampling value Amax may be one of four sampling values A0, A1, A2, A3. When the maximum sampling value Amax (e.g., A1) is less than the first reference value S1, the first voltage level V3 corresponding to the first reference value S1 may be selected as the first final activation level of the transfer control signals TGC1, TGC2 (e.g., the activation level TGCH of the transfer control signals may be maintained). When the maximum sampling value Amax (e.g., A1) is equal to or greater than the first reference value S1 and is less than the second reference value S2, the second voltage level V2 corresponding to the second reference value S2 may be selected as the first final activation level of the transfer control signals TGC1, TGC2 (e.g., the activation level TGCH of the transfer control signals may be changed). When the maximum sampling value Amax (e.g., A1) is equal to or greater than the second reference value S2, the third voltage level V1 may be selected as the first final activation level of the transfer control signals TGC1, TGC2 (e.g., the activation level TGCH of the transfer control signals may be changed).

In an example of determining the first final activation level of the transfer control signals TGC1, TGC2, the second reference value S2 may be greater than the first reference value V1. The second voltage level V2 may be less than the first voltage level V3 and may be greater than the third voltage level V1. In this case, the activation level TGCH of transfer control signals TGC1, TGC2 may decrease as the intensity of the reception light RX (e.g. a magnitude of the maximum sampling value Amax) increases. As illustrated in FIG. 6B, if the activation level TGCH of the transfer control signals TGC1, TGC2 decreases from V3 to V2 and V1, potential walls between the photo detection regions PD1, PD2 and the floating diffusion regions FD1, FD2 may increase, respectively, and thus the amount of photo charges collected in the photo detection regions PD1, PD2 may increase, respectively.

As illustrated in FIG. 7, in the methods of operating the depth pixel Z1 of FIG. 4, the reset signals RST1, RST2 may be activated to reset the floating diffusion regions FD1, FD2 before an integration time interval TINT. During the integration time interval TINT, the object 180 may be illuminated with the transmission light TX. The transmission light TX may be reflected by the object 180 and may be returned to the depth pixel Z1 as the reception light RX. The photo charges may be generated in the photo detection regions PD1, PD2 of the depth pixel Z1 by the reception light RX. The transfer control signals TGC1, TGC2 may have periodically varying intensity, may have the activation level TGCH, and may have a predetermined phase with respect to the transmission light TX. Photo charges Q1 during an activation interval of the first transfer control signal TGC1 may be stored in the first floating diffusion region FD1, and photo charges Q2 during an activation interval of the second transfer control signal TGC2 may be stored in the second floating diffusion region FD2.

During a readout time interval TRD, a sampling control signal SMPD may be activated to sample a first floating diffusion region voltage VFD1 corresponding to the photo charges Q1 as a first demodulation voltage VD1 and to sample a second floating diffusion region voltage VFD2 corresponding to the photo charges Q2 as a second demodulation voltage VD2.

Two sampling values A0, A2 may be obtained in a single frame by detecting the demodulation voltages VD1, VD2. In addition, third and fourth transfer control signals TGC3, TGC4 (not illustrated) may be obtained by shifting the first and second transfer control signals TGC1, TGC2 by about 90 degrees, respectively, Another two sampling values A1, A3 may be obtained in a next frame by repeating the above mentioned operations based on the transfer control signals TGC3, TGC4. The phase difference (e.g., the TOF) between the transmission light TX and the reception light RX may be obtained based on the sampling values A0, A1, A2, A3 that are obtained from two frames.

Although not illustrated in FIG. 7, four sampling values A0, A1, A2, A3 may be obtained in a single frame based on four transfer control signals having a phase difference of about 90 degrees, according to some embodiments.

Figure 8:
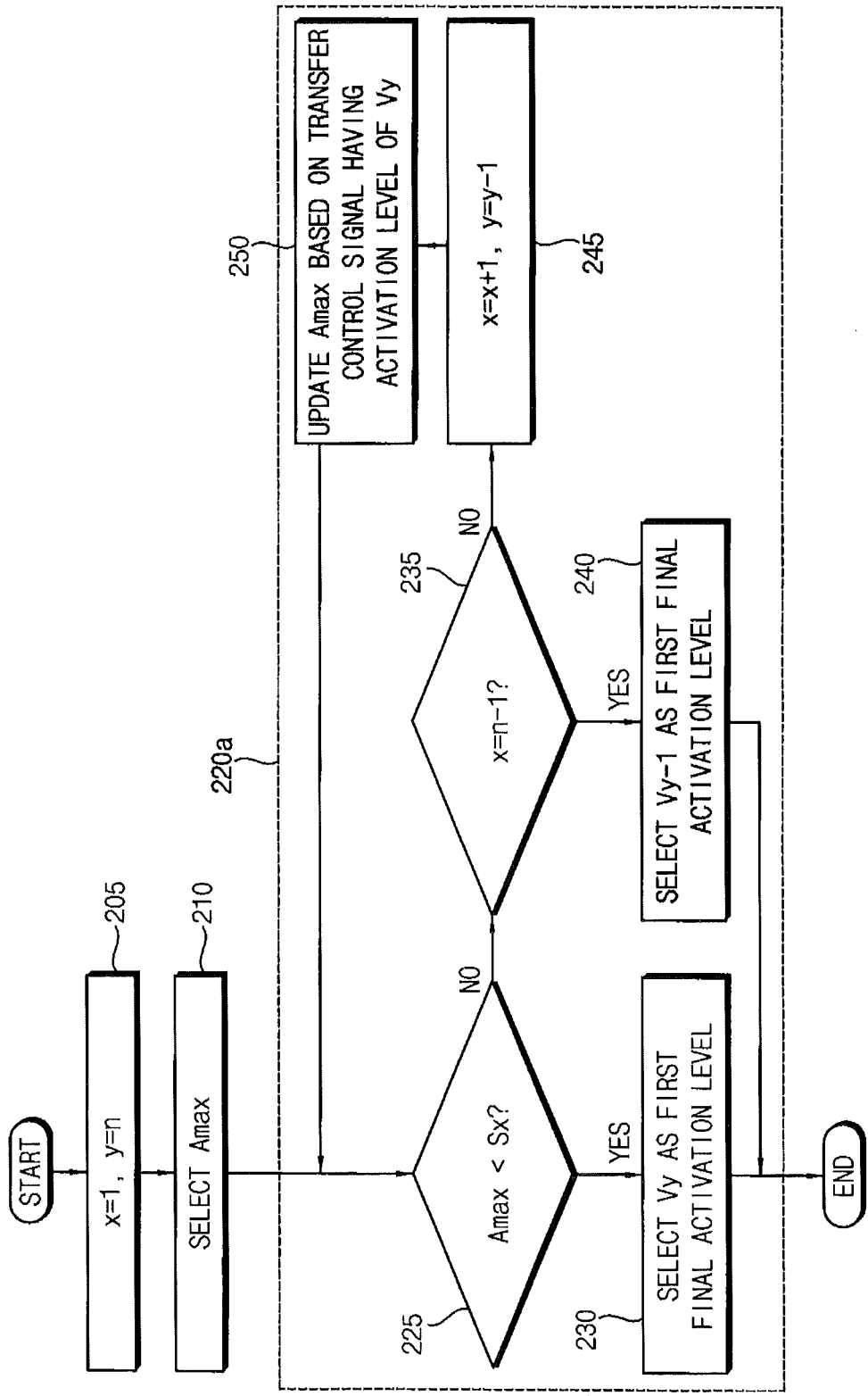
FIG. 8 is a flow chart illustrating another example of block 200 in FIG. 1.

FIG. 8 is a flow chart illustrating another example of operations corresponding to block 200 in FIG. 1.

Referring to FIG. 8, in selecting the first final activation level of the transfer control signals TGC1, TGC2 (e.g., block 220a), the maximum sampling value Amax may be updated based on the transfer control signals TGC1, TGC2 having the changed activation level (block 250). The example embodiment of FIG. 8 may be substantially the same as the example embodiment of FIG. 5 except that the operation corresponding to block 250 is further performed. For example, when the maximum sampling value Amax (e.g., A1) is equal to or greater than the first reference value S1, the activation level of the transfer control signals TGC1, TGC2 may be changed from the first voltage level V3 to the second voltage level V2, and the maximum sampling value Amax may be updated based on the transfer control signals TGC1, TGC2 having the second voltage level V2. When the updated maximum sampling value is less than the second reference value S2, the second voltage level V2 may be selected as the first final activation level of the transfer control signals TGC1, TGC2. When the updated maximum sampling value is equal to or greater than the second reference value S2, the third voltage level V3 may be selected as the first final activation level of the transfer control signals TGC1, TGC2.

In the example embodiment of FIG. 5, when the activation level TGCH of the transfer control signals TGC1, TGC2 is changed, additional sampling operations may be performed to obtain the plurality of sampling values (e.g., A0, A1, A2, A3) and to calculate the distance between the depth pixel and the object. However, such additional sampling operations may not be performed in the example embodiment of FIG. 8 even if the activation level TGCH of the transfer control signals TGC1, TGC2 is changed.

Figure 9:
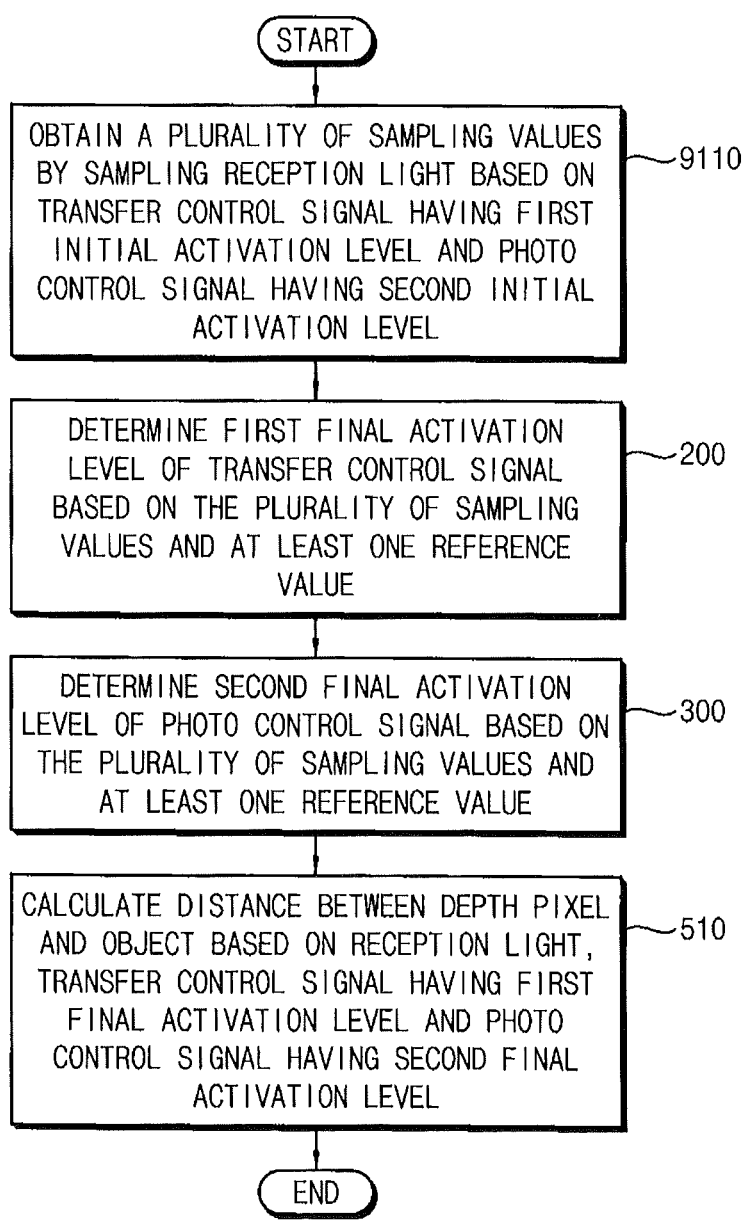
FIG. 9 is a flow chart illustrating methods of operating a depth pixel included in a 3D image sensor according to some embodiments of the present inventive concept.

FIG. 9 is a flow chart illustrating methods of operating a depth pixel included in a 3D image sensor according to some embodiments.

The methods of FIG. 9 may be applied in a depth pixel that is included in a 3D image sensor and includes a photo detection region, a photo gate, a transfer gate and a floating diffusion region.

Referring to FIG. 9, in the methods of operating the depth pixel according to some embodiments, a plurality of sampling values are obtained by sampling a reception light reflected by an object based on a transfer control signal having a first initial activation level and a photo control signal having a second initial activation level (block 9110). The photo control signal may be applied to the photo gate. The photo gate may be controlled in response to the photo control signal such that photo charges generated by the reception light are collected in the photo detection region.

A first final activation level of the transfer control signal is determined based on the plurality of sampling values and at least one reference value (block 200). The operation corresponding to block 200 may be substantially the same as the block 200 in FIG. 1. A second final activation level of the photo control signal is determined based on the plurality of sampling values and the at least one reference value (block 300). A distance between the depth pixel and the object is calculated based on the reception light, the transfer control signal having the first final activation level and the photo control signal having the second final activation level (block 510).

Figure 10:
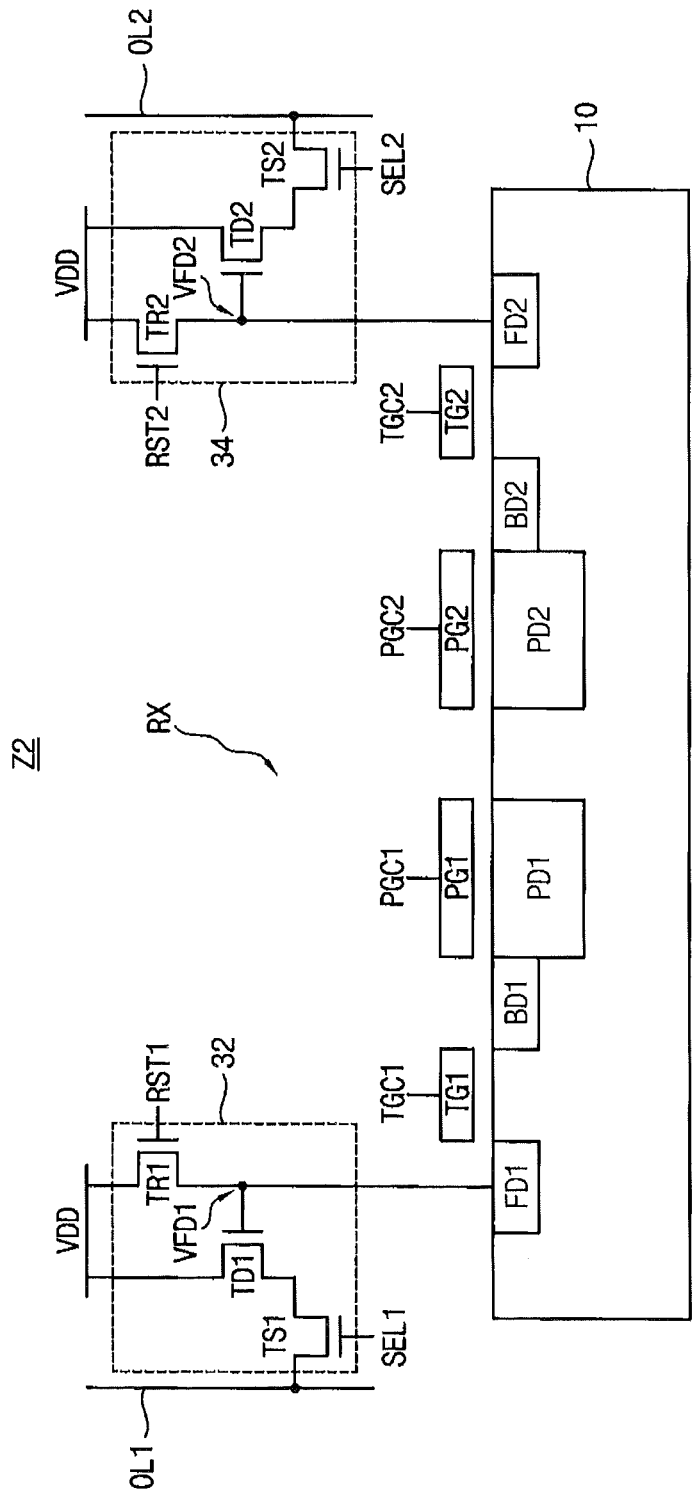
FIG. 10 is a cross-sectional view illustrating an example of a depth pixel included in the 3D image sensor of FIG. 2 and operating based on the method of FIG. 9.

FIG. 10 is a cross-sectional view illustrating an example of a depth pixel included in the 3D image sensor of FIG. 2 and operating based on the methods of FIG. 9.

Referring to FIG. 10, a depth pixel Z2 includes a first photo detection region PD1, a second photo detection region PD2, a first bridge diffusion node BD1, a second bridge diffusion node BD2, a first floating diffusion region FD1 and a second floating diffusion region FD2, which are formed in a semiconductor substrate 10. The depth pixel Z2 includes a first photo gate PG1, a second photo gates PG2, a first transfer gate TG1, a second transfer gate TG2, a first output unit 32 and a second output unit 34, which are formed over the semiconductor substrate 10.

The depth pixel Z2 of FIG. 10 may be substantially the same as the depth pixel Z1 of FIG. 4 except that the depth pixel Z2 of FIG. 10 further includes the bridge diffusion nodes BD1, BD2 and the photo gates PG1, PG2.

The bridge diffusion nodes BD1, BD2 may be formed adjacent the photo detection regions PD1, PD2, respectively. For example, the first bridge diffusion node BD1 may be formed adjacent the first photo detection regions PD1. According to some embodiments, the bridge diffusion nodes BD1, BD2 may be omitted. The photo gates PG1, PG2 may be formed to correspond to the photo detection regions PD1, PD2 over the semiconductor substrate 10, respectively. For example, the first photo gate PG1 may be formed to correspond to the first photo detection region PD1 over the semiconductor substrate 10.

Figure 11:
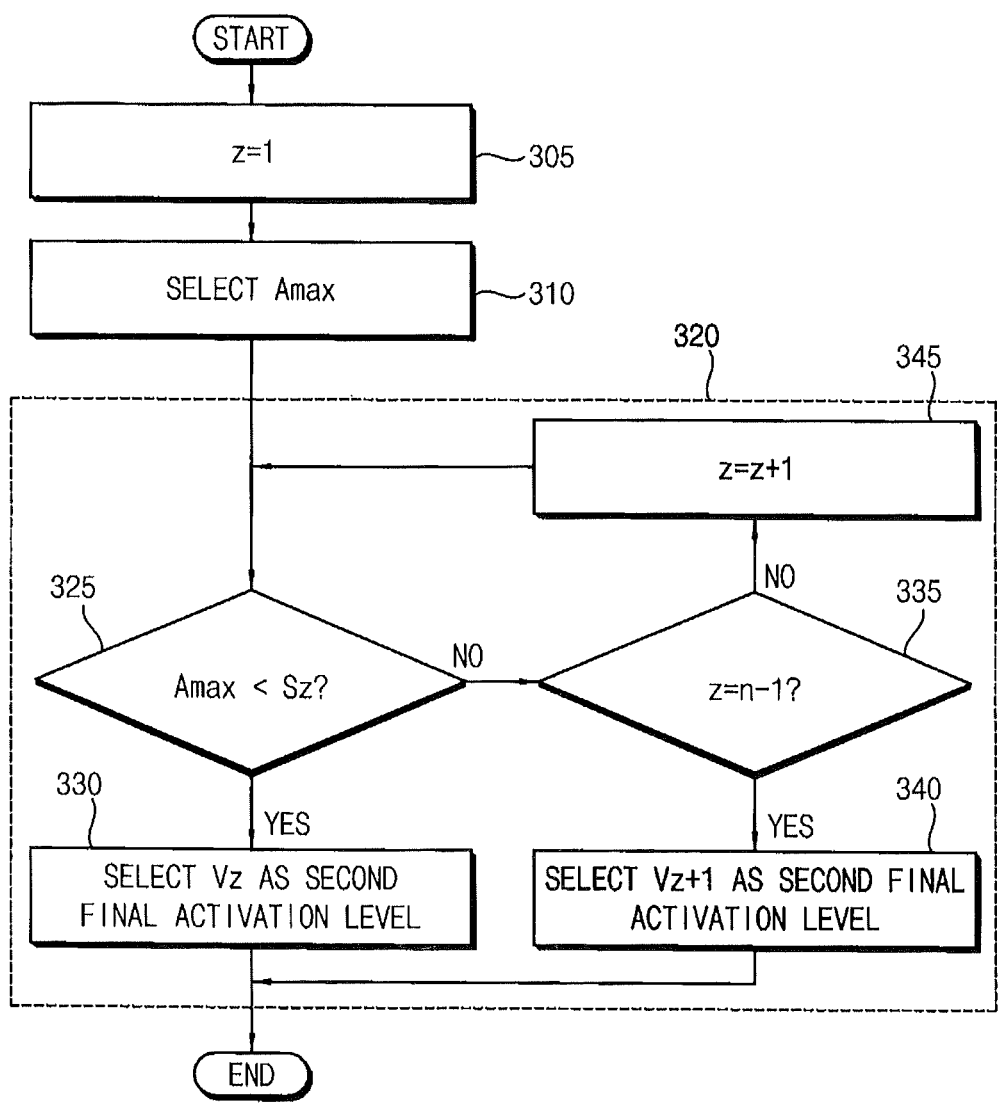
FIG. 11 is a flow chart illustrating an example of operation 300 in FIG. 9.

FIG. 11 is a flow chart illustrating an example of operations corresponding to block 300 in FIG. 9. FIGS. 12A, 12B, 13A and 13B are diagrams for describing an operation of the depth pixel of FIG. 10 based on the method of FIGS. 9 and 11.

Referring to FIGS. 3, 9, 10, 11, 12A, 12B, 13A and 13B, operations corresponding to blocks 305, 310, 320, 325, 330, 335, 340 and 345 may be similar to the operations corresponding to blocks 205, 210, 220, 225, 230, 235, 240 and 245 in FIG. 5, respectively.

For example, in the block 300, a variable z may be initialized, e.g., as one, to correspond to the second initial activation level of the photo control signals PGC1, PGC2 (block 305). A maximum sampling value Amax may be selected (block 310). The second final activation level of the photo control signals PGC1, PGC2 may be selected by comparing the maximum sampling value Amax with the at least one reference value (block 320). When the maximum sampling value Amax is less than a current reference value Sz (block 325: YES), a current voltage level Vz may be selected as the second final activation level of the photo control signals PGC1, PGC2 (block 330). When the maximum sampling value Amax is equal to or greater than the current reference value Sz (block 325: NO), it is determined whether another reference value, which is used for comparing with the maximum sampling value Amax, exists (block 335). When the another reference value exists (block 335: NO), the variable z may be changed (e.g., the variable z may increase by one) (block 345), and the above mentioned blocks 325, 330, 335 may be repeated based on the changed variable (e.g., the another reference value). When the another reference value does not exist (block 335: YES), a next voltage level Vz+1 may be selected as the second final activation level of the photo control signals PGC1, PGC2 (block 340).

For example, in an initial operation time, the second initial activation level of the photo control signals PGC1, PGC2 may correspond to the first voltage level V1'. Four sampling values A0, A1, A2, A3 may be obtained by sampling the reception light RX based on the photo control signals PGC1, PGC2 having the second initial activation level (e.g., V1'). The value A1 may be selected as the maximum sampling value Amax and may be compared with two reference values S1, S2 illustrated in FIG. 12A. When the maximum sampling value Amax (e.g., A1) is less than the first reference value S1, the first voltage level V1' corresponding to the first reference value S1 may be selected as the second final activation level of the photo control signals PGC1, PGC2. When the maximum sampling value Amax (e.g., A1) is equal to or greater than the first reference value S1 and is less than the second reference value S2, the second voltage level V2' corresponding to the second reference value S2 may be selected as the second final activation level of the photo control signals PGC1, PGC2. When the maximum sampling value Amax (e.g., A1) is equal to or greater than the second reference value S2, the third voltage level V3' may be selected as the second final activation level of the photo control signals PGC1, PGC2.

Figure 12A:
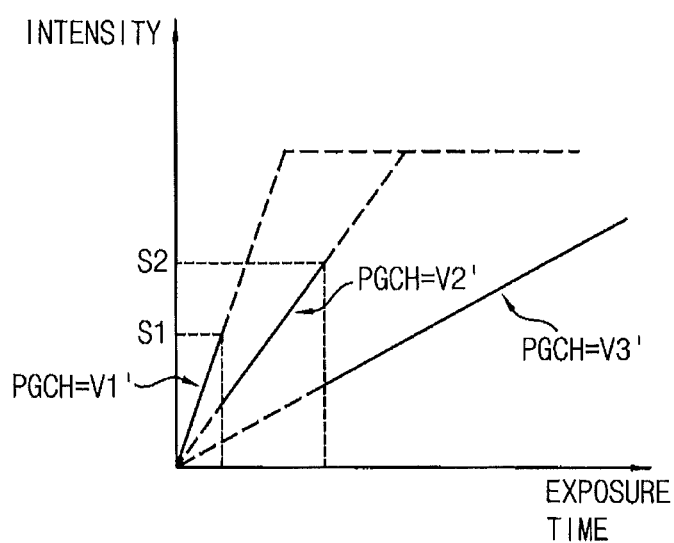
FIGS. 12A, 12B, 13A and 13B are diagrams for describing an operation of the depth pixel of FIG. 10 based on the methods of FIGS. 9 and 11.
Figure 12B:
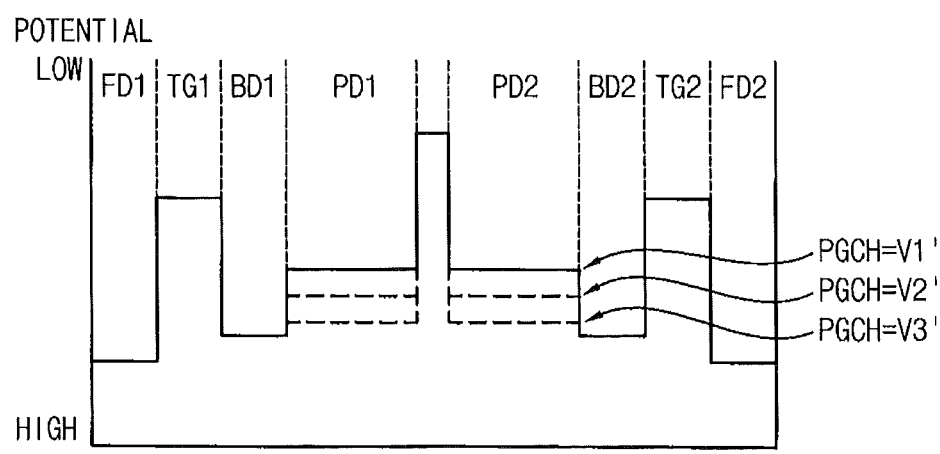

In an example of determining the second final activation level of the photo control signals PGC1, PGC2, the second reference value S2 may be greater than the first reference value V1. The second voltage level V2' may be greater than the first voltage level V1' and may be less than the third voltage level V3'. In this case, the activation level PGCH of photo control signals PGC1, PGC2 may increase as the intensity of the reception light RX increases. As illustrated in FIG. 12B, if the activation level PGCH of the photo control signals PGC1, PGC2 increases from V1' to V2' and V3', charge storage capacities of the photo detection regions PD1, PD2 may increase, respectively.

Figure 13A:
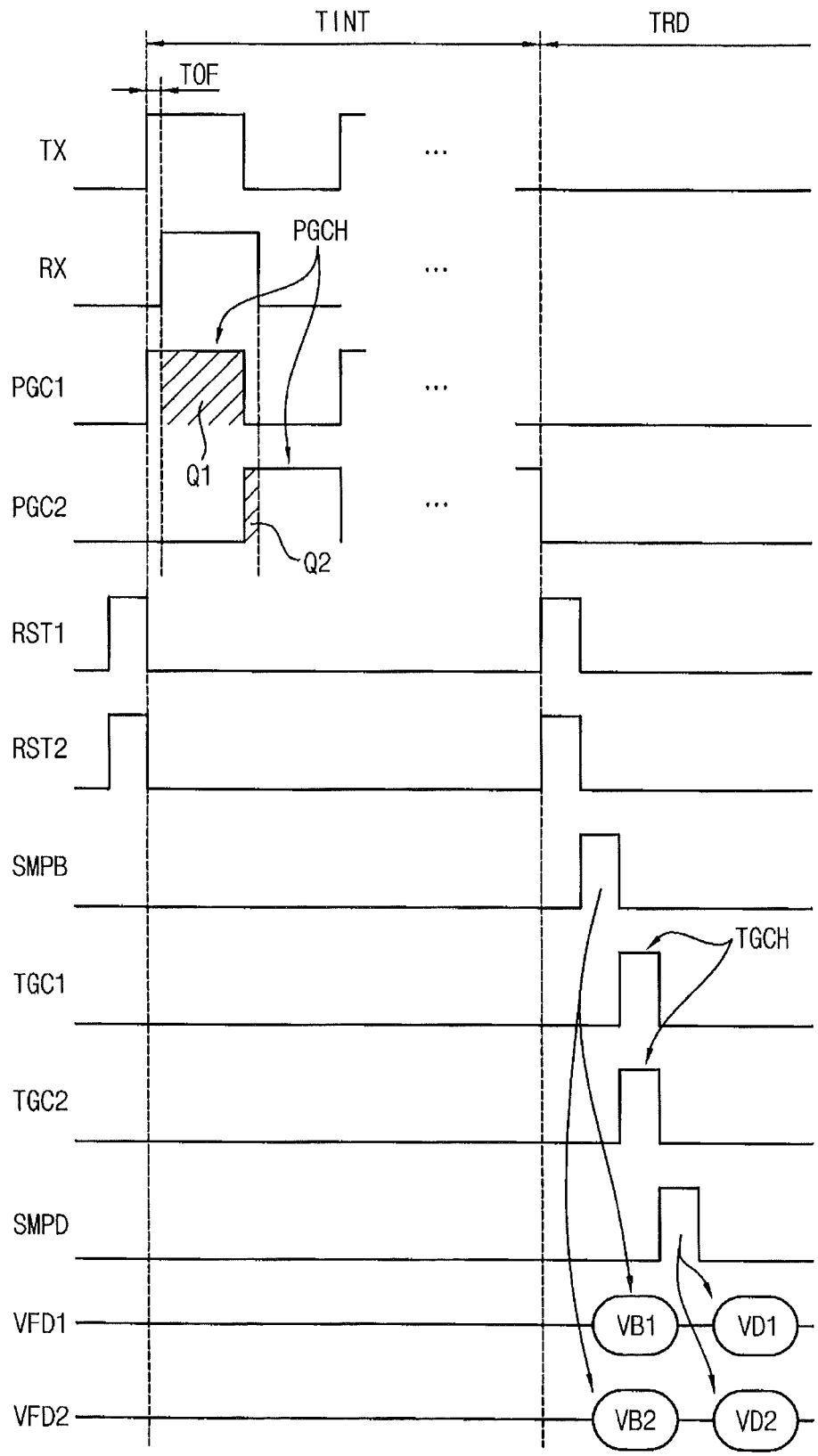

As illustrated in FIG. 13A, in the methods of operating the depth pixel Z2 of FIG. 10, the reset signals RST1, RST2 may be activated to reset the floating diffusion regions FD1, FD2 before an integration time interval TINT. During the integration time interval TINT, the object 180 may be illuminated with the transmission light TX. The transmission light TX may be reflected by the object 180 and may be returned to the depth pixel Z2 as the reception light RX. The photo charges may be generated in the photo detection regions PD1, PD2 of the depth pixel Z2 by the reception light RX. The photo control signals PGC1, PGC2 may have periodically varying intensity, may have the activation level PGCH, and may have a predetermined phase with respect to the transmission light TX. Photo charges Q1 during an activation interval of the first photo control signal PGC1 may be stored in the first bridge diffusion node BD1, and photo charges Q2 during an activation interval of the second photo control signal PGC2 may be stored in the second bridge diffusion node BD2.

During a readout time interval TRD, the reset signals RST1, RST2 may be activated to reset the floating diffusion regions FD1, FD2. A first sampling control signal SMPB may be activated after the reset signals RST1, RST2 are activated, and then the reset floating diffusion region voltages VFD1, VFD2 may be sampled as the noise voltages VB1, VB2, respectively. The transfer control signals TGC1, TGC2 may be activated to electrically connect the bridge diffusion nodes BD1, BD2 with the floating diffusion regions FD1, FD2, respectively, and the photo charges Q1, Q2 may be transferred from the bridge diffusion nodes BD1, BD2 to the floating diffusion regions FD1, FD2, respectively, after the noise voltages VB1, VB2 are sampled. A second sampling control signal SMPD may be activated to sample the floating diffusion region voltages VFD1, VFD2 as the demodulation voltages VD1, VD2, respectively.

Two sampling values A0, A2 may be obtained in a single frame by detecting the noise voltages VB1, VB2 and the demodulation voltages VD1, VD2. In addition, third and fourth photo control signals PGC3, PGC4 (not illustrated) may be obtained by shifting the first and second photo control signals PGC1, PGC2 by about 90 degrees, respectively, Another two sampling values A1, A3 may be obtained in a next frame by repeating the above mentioned operations based on the photo control signals PGC3, PGC4. The phase difference (e.g., the TOF) between the transmission light TX and the reception light RX may be obtained based on the sampling values A0, A1, A2, A3 that are obtained from two frames.

Figure 13B:
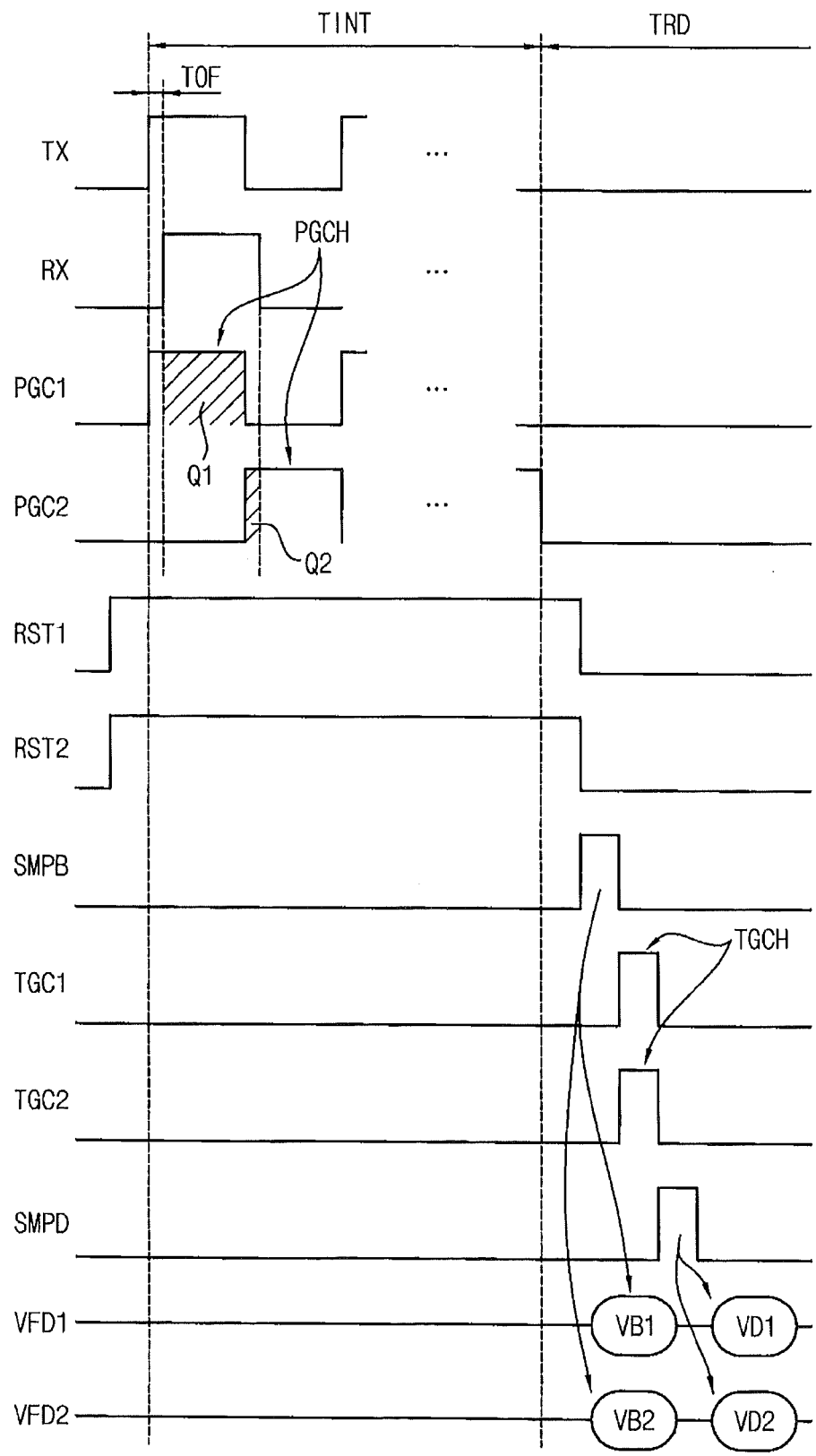

According to some embodiments, the reset signals RST1, RST2 may be activated before the integration time interval TINT and may maintain the activation state during the whole integration time interval TINT, as illustrated in FIG. 13B. Although not illustrated in FIGS. 13A and 13B, four sampling values A0, A1, A2, A3 may be obtained in a single frame based on four transfer control signals having a phase difference of about 90 degrees, according to example embodiments.

As described above, the example embodiment illustrated in FIG. 7 may perform a 3T operation such that a true CDS operation is not performed, and the example embodiments illustrated in FIGS. 13A and 13B may perform a 4T operation such that the true CDS operation is performed.

Figure 14:
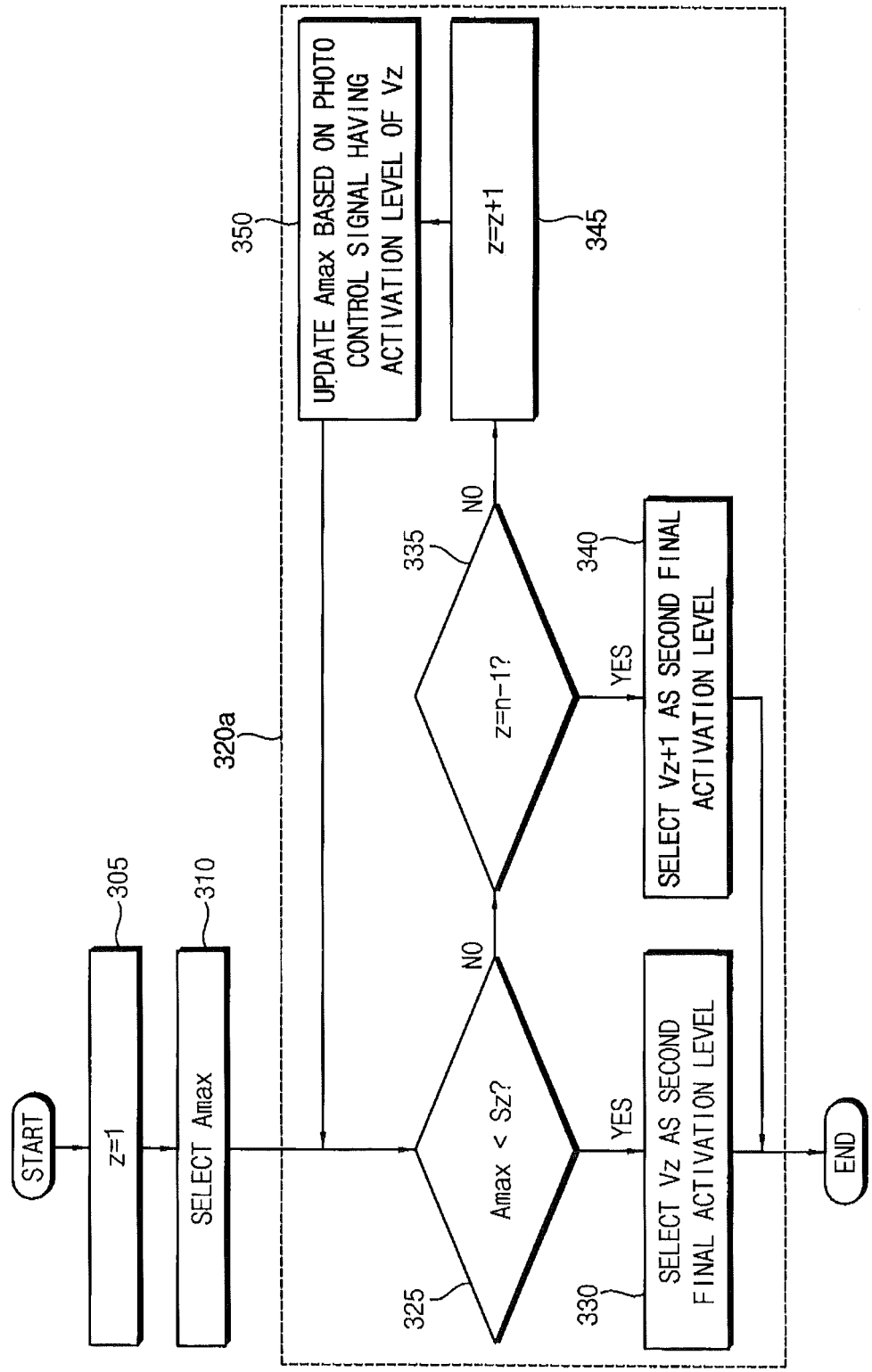
FIG. 14 is a flow chart illustrating another example of operation 300 in FIG. 9.

FIG. 14 is a flow chart illustrating another example of operations corresponding to block 300 in FIG. 9.

Referring to FIG. 14, in selecting the second final activation level of the photo control signals PGC1, PGC2 (e.g., in block 320a), the maximum sampling value Amax may be updated based on the photo control signals PGC1, PGC2 having the changed activation level (block 350). The example embodiments of FIG. 14 may be substantially the same as the example embodiments of FIG. 11 except that the operation corresponding to block 350 is further performed.

Figure 15:
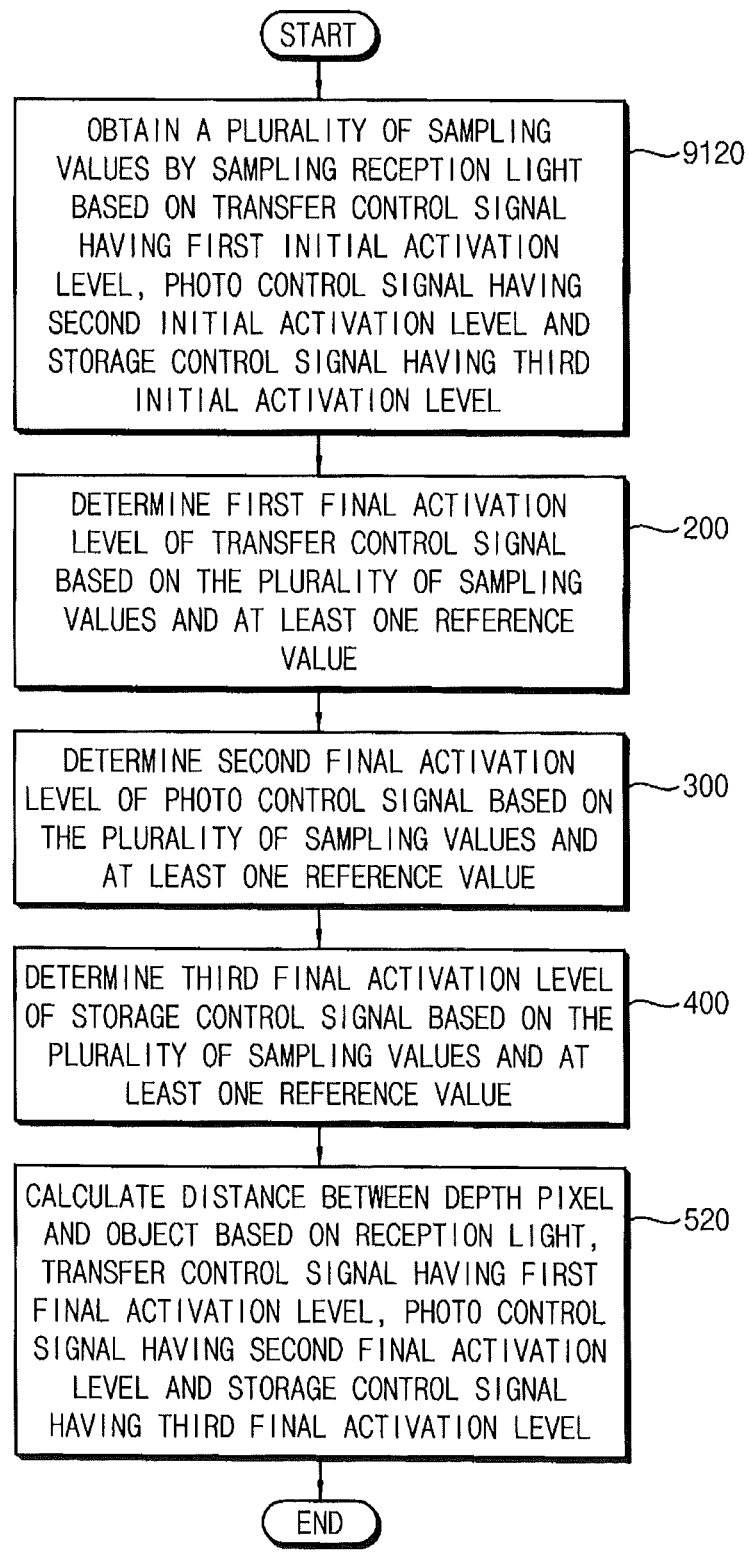
FIG. 15 is a flow chart illustrating methods of operating a depth pixel included in a 3D image sensor according to some embodiments of the present inventive concept.

FIG. 15 is a flow chart illustrating methods of operating a depth pixel included in a 3D image sensor according to some embodiments.

The methods of FIG. 15 may be applied in a depth pixel that is included in a 3D image sensor and includes a photo detection region, a photo gate, a storage gate, a storage node, a transfer gate and a floating diffusion region.

Referring to FIG. 15, in the methods of operating the depth pixel according to some embodiments, a plurality of sampling values are obtained by sampling a reception light reflected by an object based on a transfer control signal having a first initial activation level, a photo control signal having a second initial activation level and a storage control signal having a third initial activation level (block 9120). The storage control signal may be applied to the storage gate. The storage gate may be controlled in response to the storage control signal such that photo charges generated in the photo detection region by the reception light are transferred to the storage node.

A first final activation level of the transfer control signal is determined based on the plurality of sampling values and at least one reference value (block 200). The operation corresponding to block 200 may be substantially the same as that of block 200 in FIG. 1. A second final activation level of the photo control signal is determined based on the plurality of sampling values and the at least one reference value (block 300). The operation corresponding to block 300 may be substantially the same as that of block 300 in FIG. 9. A third final activation level of the storage control signal is determined based on the plurality of sampling values and the at least one reference value (block 400). A distance between the depth pixel and the object is calculated based on the reception light, the transfer control signal having the first final activation level, the photo control signal having the second final activation level and the storage control signal having the third final activation level (block 520).

Figure 16:
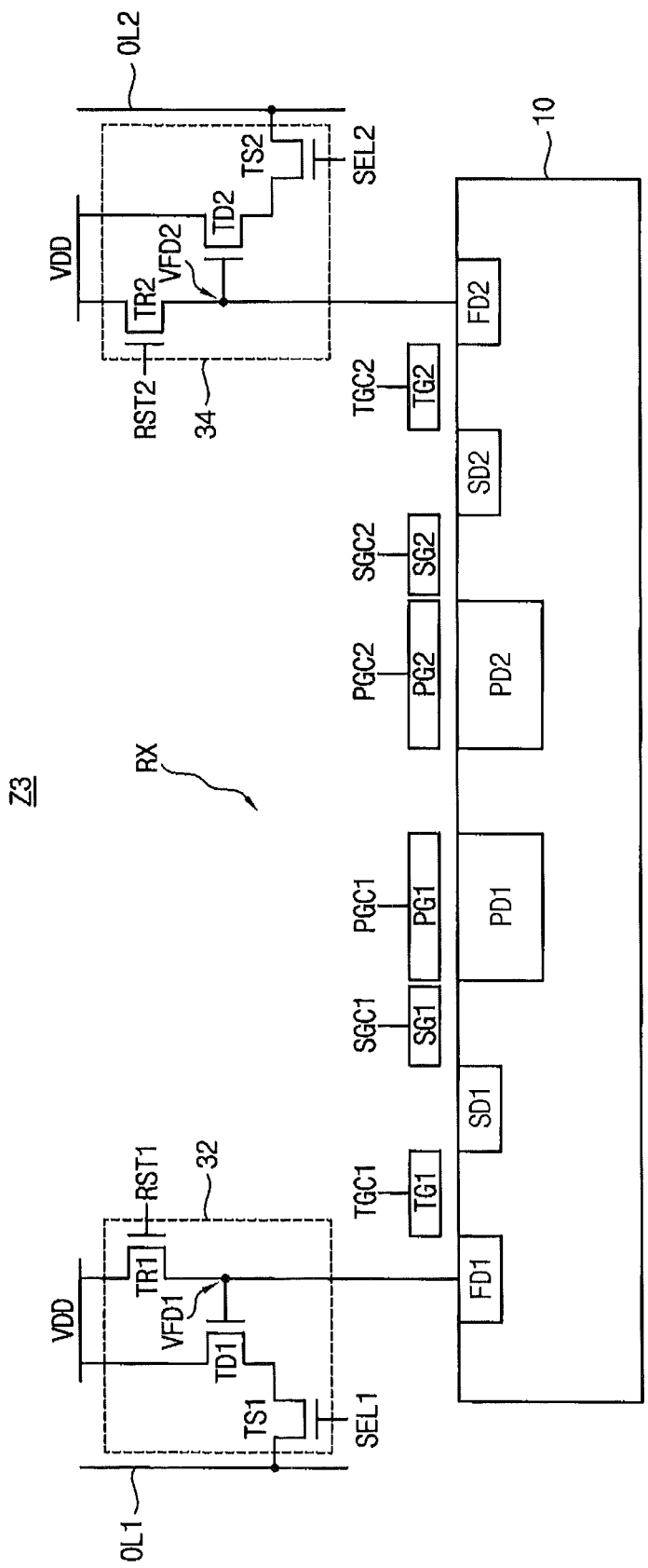
FIG. 16 is a cross-sectional view illustrating an example of a depth pixel included in the 3D image sensor of FIG. 2 and operating based on the method of FIG. 15.

FIG. 16 is a cross-sectional view illustrating an example of a depth pixel included in the 3D image sensor of FIG. 2 and operating based on the method of FIG. 15.

Referring to FIG. 16, a depth pixel Z3 includes a first photo detection region PD1, a second photo detection region PD2, a first storage node SD1, a second storage node SD2, a first floating diffusion region FD1 and a second floating diffusion region FD2, which are formed in a semiconductor substrate 10. The depth pixel Z3 includes a first photo gate PG1, a second photo gate PG2, a first storage gate SG1, a second storage gate SG2, a first transfer gate TG1, a second transfer gate TG2, a first output unit 32 and a second output unit 34, which are formed over the semiconductor substrate 10.

The depth pixel Z3 of FIG. 15 may be substantially the same as the depth pixel Z2 of FIG. 10 except that the depth pixel Z3 of FIG. 15 further includes the storage gates SG1, SG2 and the storage nodes SD1, SD2 and the bridge diffusion nodes BD1, BD2 are omitted.

The storage nodes SD1, SD2 may be formed spaced apart from the photo detection regions PD1, PD2, respectively. For example, the first storage node SD1 may be formed spaced apart from the first photo detection region PD1. The storage gates SG1, SG2 may be formed between the photo detection regions PD1, PD2 and the storage nodes SD1, SD2, respectively, over the semiconductor substrate 10. For example, the first storage gate SG1 may be formed between the first photo detection region PD1 and the first storage node SD1 over the semiconductor substrate 10.

Figure 17:
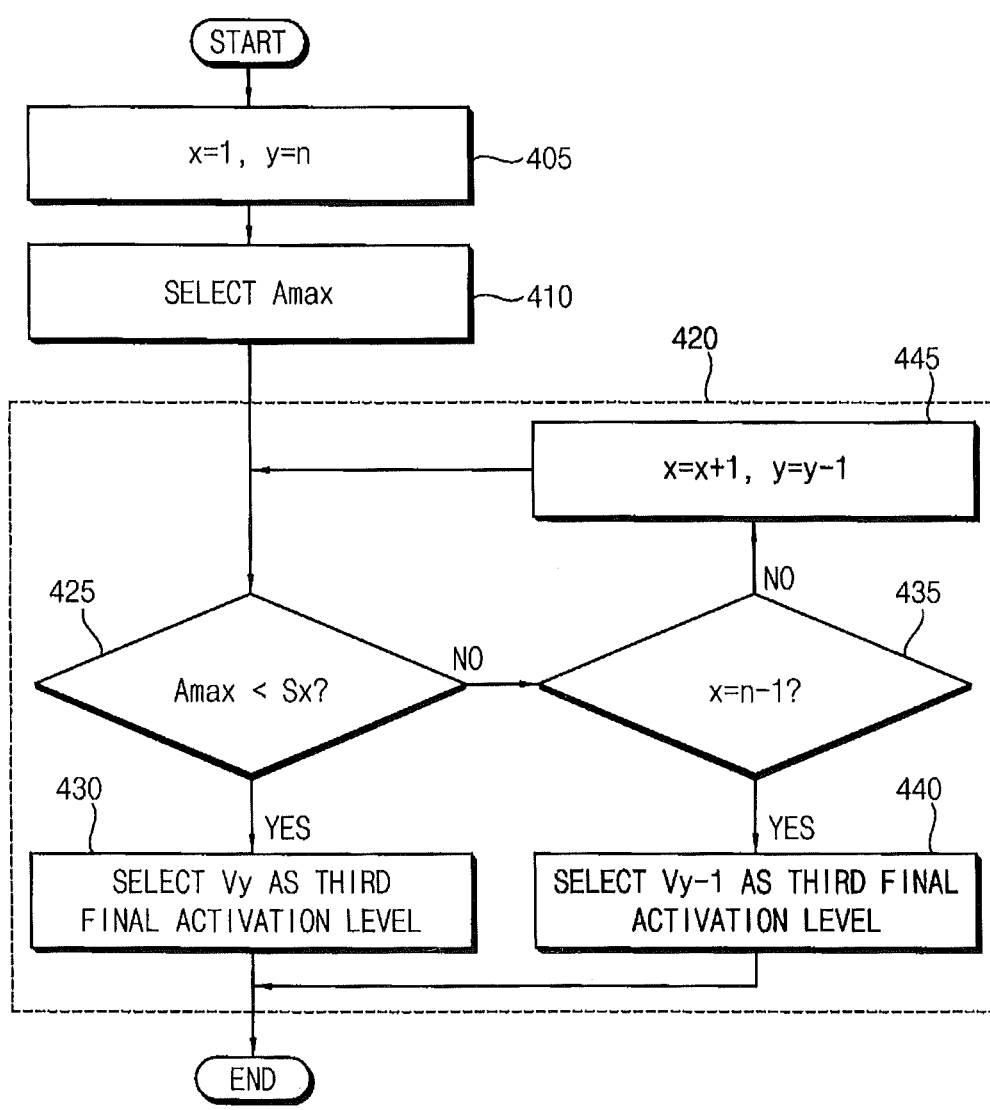
FIG. 17 is a flow chart illustrating an example of operation 400 in FIG. 15.

FIG. 17 is a flow chart illustrating an example of operations corresponding to block 400 in FIG. 15. FIGS. 18A, 18B, 19A and 19B are diagrams for describing an operation of the depth pixel of FIG. 16 based on the methods of FIGS. 15 and 17.

Referring to FIGS. 3, 15, 16, 16, 18A, 18B, 19A and 19B, blocks 405, 410, 420, 425, 430, 435, 440 and 445 may be substantially the same as the operations corresponding to blocks 205, 210, 220, 225, 230, 235, 240 and 245 in FIG. 5, respectively.

Figure 18A:
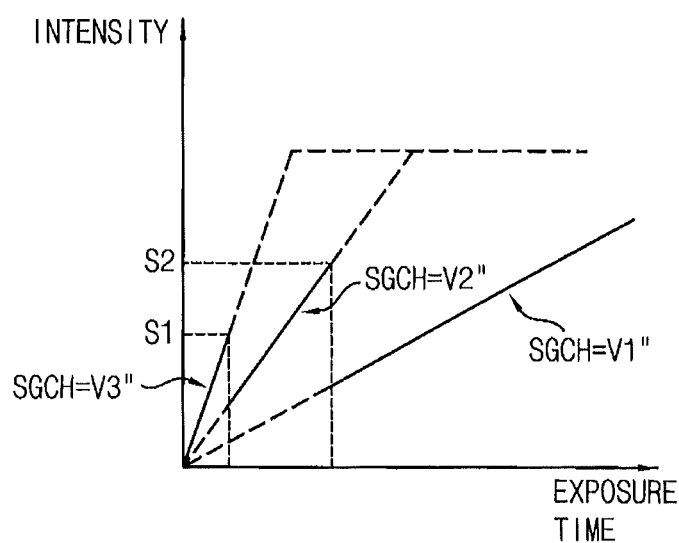
Figure 18B:
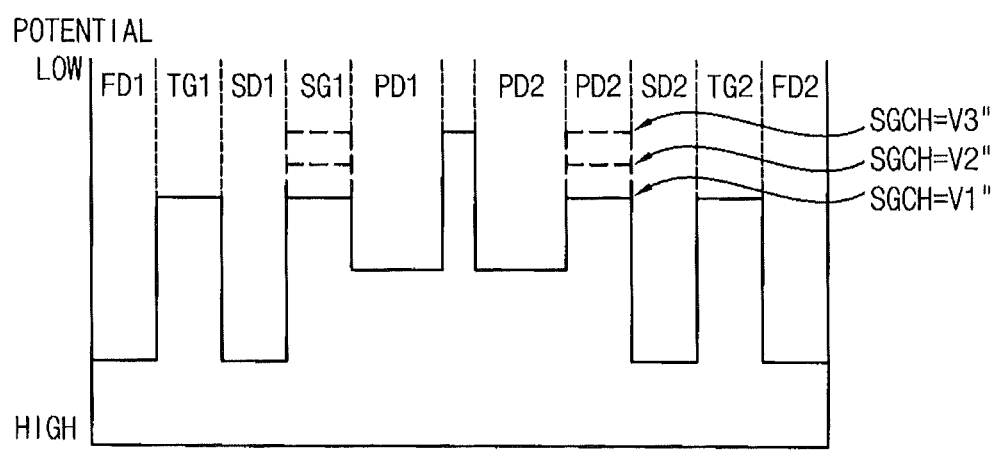

In an example of determining the third final activation level of the storage control signals SGC1, SGC2, the second reference value S2 may be greater than the first reference value V1. The second voltage level V2" may be less than the first voltage level V3" and may be greater than the third voltage level V1". In this case, an activation level SGCH of storage control signals SGC1, SGC2 may decrease as the intensity of the reception light RX increases. As illustrated in FIG. 18B, if the activation level SGCH of the storage control signals SGC1, SGC2 decreases from V3" to V2" and V1", the amount of photo charges collected in the photo detection regions PD1, PD2 may increase, respectively.

Figure 19A:
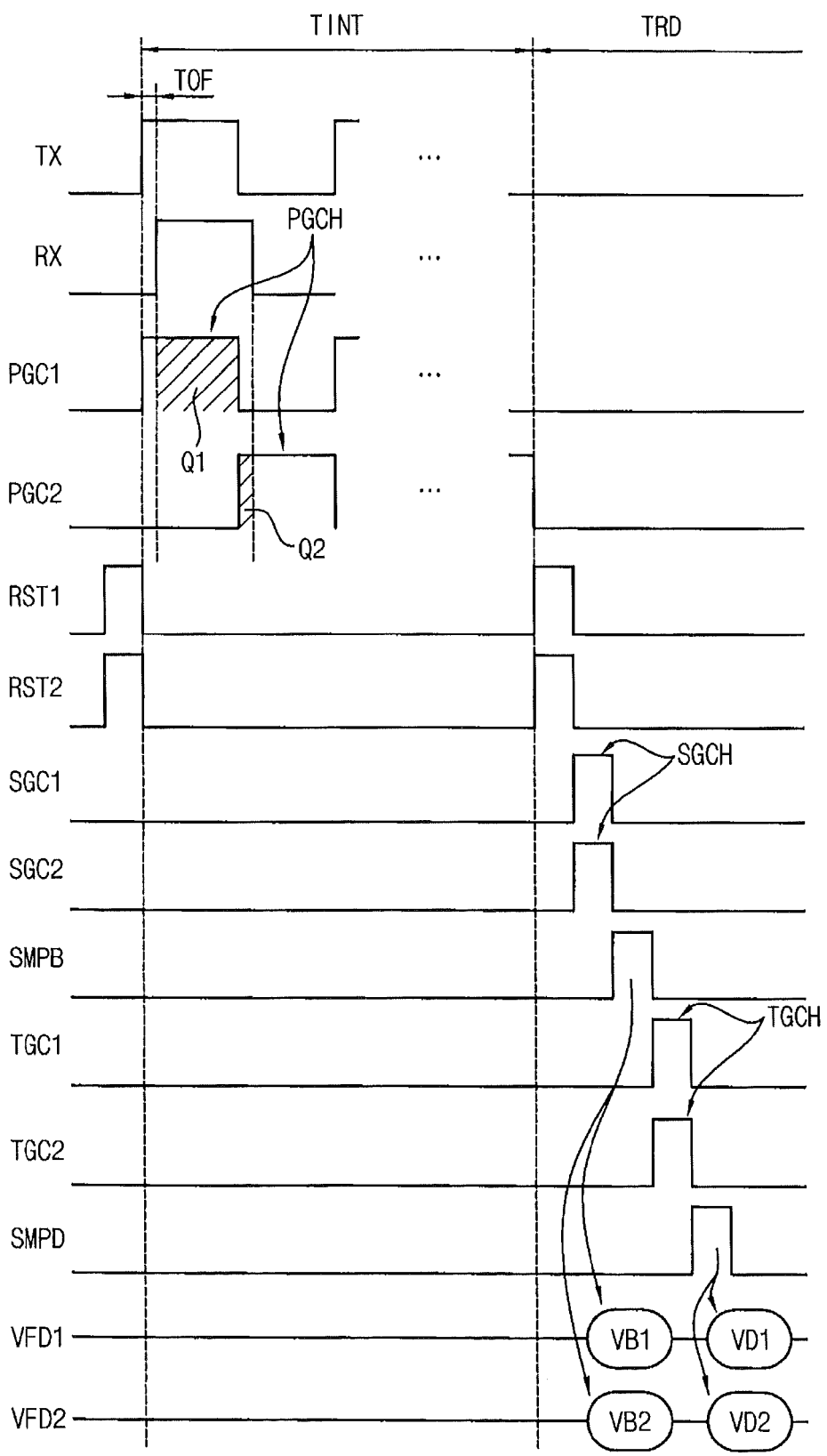

Example embodiments of FIGS. 19A and 19B may be similar to the example embodiments of FIGS. 13A and 13B, respectively. In the example embodiments of FIGS. 19A and 19B, the photo charges Q1, Q2 are not stored in the bridge diffusion nodes BD1, BD2 during the integration time interval TINT. In the example embodiments of FIGS. 19A and 19B, the photo charges Q1, Q2 may be stored in the photo detection regions PD1, PD2 during the integration time interval TINT, and the storage control signals SGC1, SGC2 may be activated to electrically connect the photo detection regions PD1, PD2 with the storage nodes SD1, SD2 during the readout time interval TRD.

Figure 20:
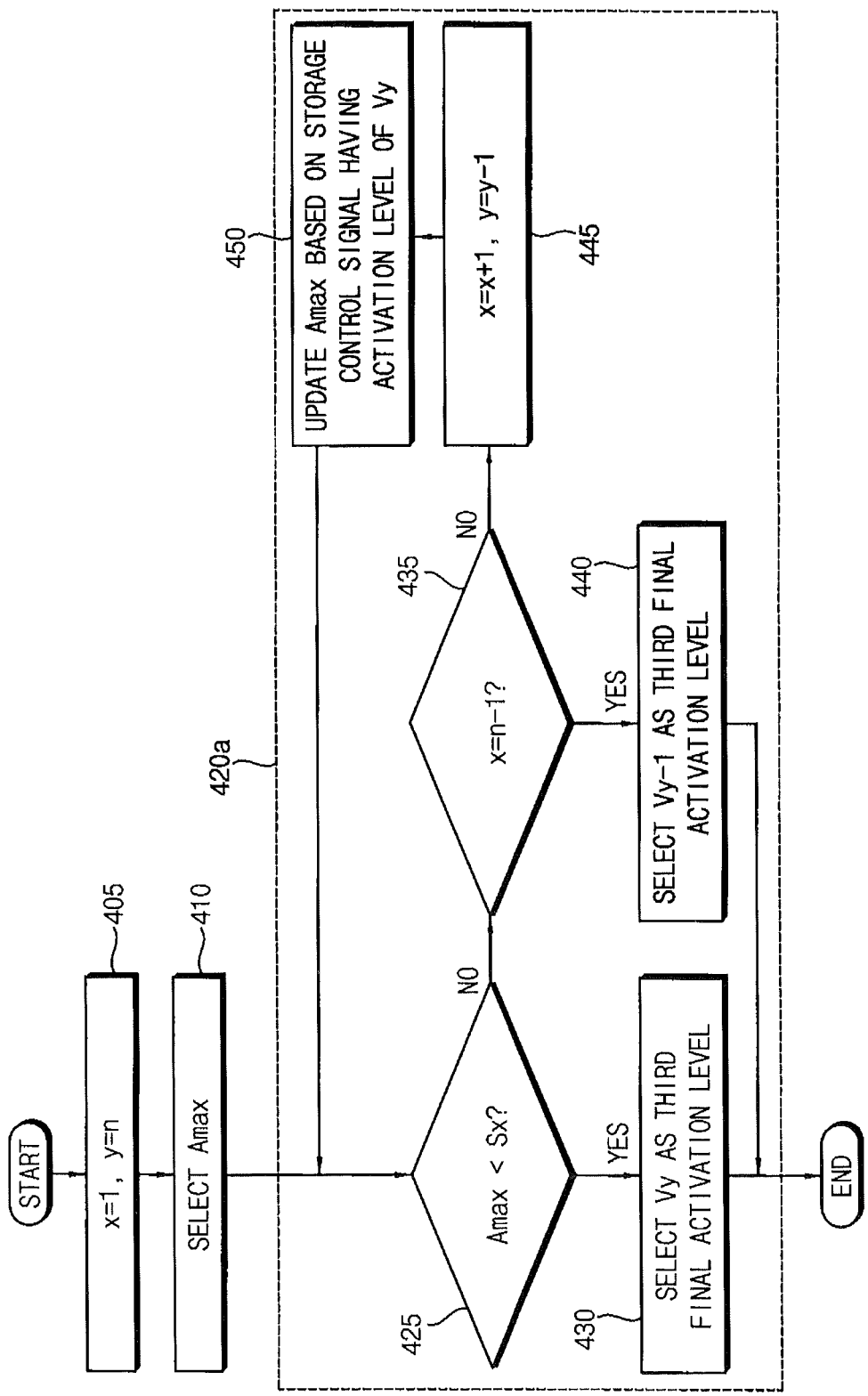
FIG. 20 is a flow chart illustrating another example of operation 400 in FIG. 15.

FIG. 20 is a flow chart illustrating another example of operations corresponding to block 400 in FIG. 15.

Referring to FIG. 20, in selecting the third final activation level of the storage control signals SGC1, SGC2 (e.g., in block 420a), the maximum sampling value Amax may be updated based on the storage control signals SGC1, SGC2 having the changed activation level (block 450). The example embodiment of FIG. 20 may be substantially the same as the example embodiment of FIG. 17 except that the operation corresponding to block 450 is further performed.

Figure 21:
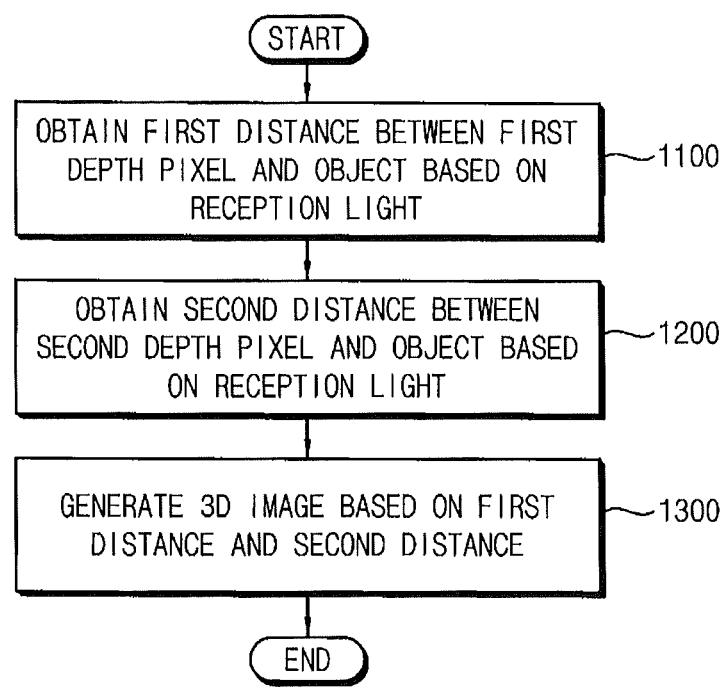
FIG. 21 is a flow chart illustrating methods of operating a 3D image sensor according to some embodiments of the present inventive concept.

FIG. 21 is a flow chart illustrating methods of operating a 3D image sensor according to some embodiments.

Referring to FIG. 21, in the method of operating the 3D image sensor including a plurality of depth pixels according to example embodiments, a first distance between a first depth pixel of the plurality of depth pixels and an object is obtained based on a reception light reflected by the object (block 1100). A second distance between a second depth pixel of the plurality of depth pixels and the object is obtained based on the reception light (block 1200). A 3D image is generated based on the first distance and the second distance (block 1300). The first and second distances in the blocks 1100 and 1200 may be obtained based on one or more of the methods of FIGS. 1, 9 and 15.

Figure 22:
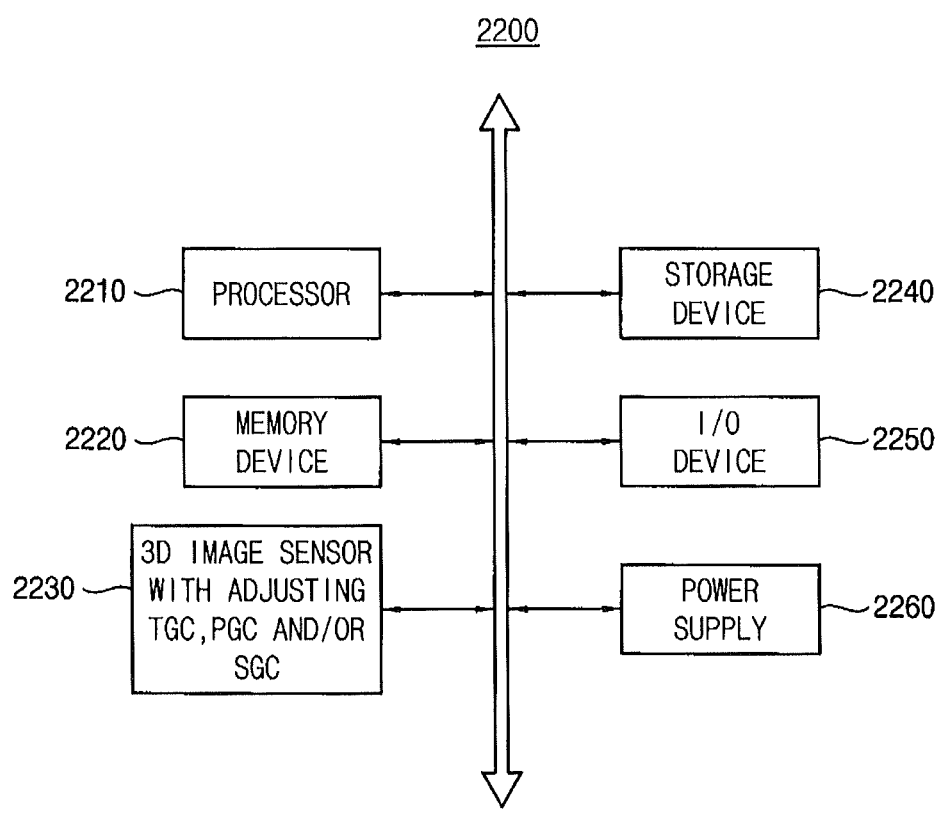
FIG. 22 is a diagram illustrating a computing system according to some embodiments of the present inventive concept.

FIG. 22 is a diagram illustrating a computing system according to some embodiments.

Referring to FIG. 22, a computing system 2200 includes a processor 2210, a memory device 2220, a 3D image sensor 2230, a storage device 2240, an input/output (I/O) device 2250 and a power supply 2260. Although not illustrated in FIG. 22, the computing system 2200 may further include a plurality of ports for communicating a video card, a sound card, a memory card, a universal serial bus (USB) device and/or other electric devices.

The processor 2210 may perform various computing functions. The processor 2210 may be a micro processor and/or a central processing unit (CPU). The processor 2210 may be connected to the memory device 2220, the storage device 2240, and the I/O device 2250 via a bus, e.g., an address bus, a control bus, and/or a data bus. The processor 2210 may be connected to an extended bus, e.g., a peripheral component interconnection (PCI) bus.

The memory device 2220 may store data for operations of the computing system 2200. For example, the memory device 2220 may include at least one volatile memory device, e.g., a dynamic random access memory (DRAM) device, a static random access memory (SRAM) device, etc., and/or at least one nonvolatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc.

The storage device 2240 may include a solid state drive (SSD) device, a hard disk drive device and/or a CD-ROM device. The I/O device 2250 may include input devices, e.g., a keyboard, a keypad and/or a mouse, and output devices, e.g., a printer and/or a display device. The power supply 2260 may provide a power for operations of the computing system 2200.

The 3D image sensor 2230 may communicate with the processor 2210 via the bus or other communication links. The 3D image sensor 2230 may operate based on at least one of the methods of FIGS. 1, 9, 15 and 21, thereby precisely measuring a distance between depth pixels in the 3D image sensor and an object even if an intensity of light reflected by the object increases.

According to some embodiments, the computing system 2200 and/or components of the computing system 2200 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

In some embodiments, the 3D image sensor 2230 and the processor 2210 may be fabricated as one integrated circuit chip. In example embodiments, the 3D image sensor 2230 and the processor 2210 may be fabricated as two separate integrated circuit chips.

FIG. 23 is a block diagram illustrating an example of an interface used for the computing system of FIG. 22.

Referring to FIG. 23, the computing system 1000 may be implemented by a data processing device that uses, or supports a mobile industry processor interface (MIPI) interface (e.g., a mobile phone, a personal digital assistant (PDA), a portable multimedia player (PMP), and/or a smart phone). The computing system 1000 may include an application processor 1110, a 3D image sensor 1140, a light source 1145 and/or a display device 1150.

A CSI host 1112 of the application processor 1110 may perform a serial communication with a CSI device 1141 of the image sensor 1140 using a camera serial interface (CSI). In some embodiments, the CSI host 1112 may include a light deserializer (DES), and the CSI device 1141 may include a light serializer (SER). A DSI host 1111 of the application processor 1110 may perform a serial communication with a DSI device 1151 of the display device 1150 using a display serial interface (DSI). In some embodiments, the DSI host 1111 may include a light serializer (SER), and the DSI device 1151 may include a light deserializer (DES).

The light source 1145 may communicate with the 3D image sensor 1140 and the application processor 1110. The light source 1145 may output a modulated transmission light. The 3D image sensor 1140 may provide depth information based on a reception light reflected from an object and may operate based on at least one of the methods of FIGS. 1, 9, 15 and 21, thereby precisely measuring a distance between depth pixels in the 3D image sensor and the object even if an intensity of the reception light increases.

The computing system 1000 may further include a radio frequency (RF) chip 1160. The RF chip 1160 may perform a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications of the PHY 1161.

The computing system 1000 may include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220 and/or a worldwide interoperability for microwave access (WIMAX) 1230. However, the structure and the interface of the computing system 1000 are not limited thereto.

The above described embodiments may be applied to a 3D image sensor, and an electronic system having the 3D image sensor. For example, the electronic system may be a system using the 3D image sensor, e.g., a computer, a digital camera, a 3D camera, a cellular phone, a personal digital assistant (PDA), a scanner, a navigation system, a video phone, a surveillance system, an auto-focusing system, a tracking system, a motion-sensing system and/or an image-stabilization system.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a depth pixel, comprising:
    responsive to a transfer control signal having a first initial activation level being applied to a transfer gate in the depth pixel, obtaining a plurality of sampling values by sampling a reception light that is reflected by an object that is illuminated by transmission light, ones of the plurality of sampling values corresponding to an intensity of the reception light;
    determining a first final activation level of the transfer control signal based on the plurality of sampling values and at least one reference value; and
    calculating a distance between the depth pixel and the object based on the reception light and the transfer control signal having the first final activation level.

2. The method according to claim 1, wherein determining the first final activation level of the transfer control signal comprises:
    selecting a maximum sampling value of the plurality of sampling values; and
    selecting the first final activation level of the transfer control signal by comparing the maximum sampling value with the at least one reference value.

3. The method according to claim 2,
    wherein the at least one reference value includes a first reference value and a second reference value,
    wherein selecting the first final activation level of the transfer control signal comprises:
    selecting a first voltage level as the first final activation level, responsive to the maximum sampling value being less than the first reference value;
    selecting a second voltage level as the first final activation level responsive to the maximum sampling value being equal to or greater than the first reference value and less than the second reference value; and
    selecting a third voltage level as the first final activation level responsive to the maximum sampling value being equal to or greater than the second reference value, and
    wherein the second voltage level is less than the first voltage level and is greater than the third voltage level.

4. The method according to claim 2,
    wherein the at least one reference value includes a first reference value and a second reference value, and
    wherein selecting the first final activation level of the transfer control signal comprises:
    selecting a first voltage level as the first final activation level responsive to the maximum sampling value being less than the first reference value;
    updating the maximum sampling value based on a second voltage level responsive to the maximum sampling value being equal to or greater than the first reference value;
    selecting the second voltage level as the first final activation level responsive to the updated maximum sampling value being less than the second reference value; and
    selecting a third voltage level as the first final activation level responsive to the updated maximum sampling value being equal to or greater than the second reference value.

5. The method according to claim 1, further comprising:
    applying a photo control signal to a photo gate that is formed over a photo detection region of the depth pixel, wherein obtaining the plurality of sampling values comprises obtaining the plurality of sampling values by sampling the reception light responsive to the transfer control signal having the first initial activation level and the photo control signal having a second initial activation level; and
    determining a second final activation level of the photo control signal based on the plurality of sampling values and the at least one reference value,
    wherein the distance between the depth pixel and the object is calculated based on the reception light, the transfer control signal having the first final activation level and the photo control signal having the second final activation level.

6. The method according to claim 5, wherein determining the second final activation level of the photo control signal comprises:
    selecting a maximum sampling value of the plurality of sampling values; and
    selecting the second final activation level of the photo control signal by comparing the maximum sampling value with the at least one reference value.

7. The method according to claim 6, wherein the at least one reference value includes a first reference value and a second reference value,
    wherein selecting the second final activation level of the photo control signal comprises:
    selecting a first voltage level as the second final activation level responsive to the maximum sampling value being less than the first reference value;
    selecting a second voltage level as the second final activation level responsive to the maximum sampling value being equal to or greater than the first reference value and less than the second reference value; and selecting a third voltage level as the second final activation level responsive to the maximum sampling value being equal to or greater than the second reference value, wherein the second voltage level is greater than the first voltage level and is less than the third voltage level.

8. A method of operating a depth pixel included in a three-dimensional (3D) image sensor, the depth pixel including a photo detection region, a transfer gate and a floating diffusion region, the method comprising:

obtaining a plurality of sampling values by sampling a reception light reflected by an object based on a transfer control signal having a first initial activation level, the transfer control signal being applied to the transfer gate;

determining a first final activation level of the transfer control signal based on the plurality of sampling values and at least one reference value; and calculating a distance between the depth pixel and the object based on the reception light and the transfer control signal having the first final activation level.

9. The method according to claim 8, wherein determining the first final activation level of the transfer control signal comprises:

selecting a maximum sampling value of the plurality of sampling values; and selecting the first final activation level of the transfer control signal by comparing the maximum sampling value with the at least one reference value, wherein the at least one reference value includes a first reference value and a second reference value, wherein selecting the first final activation level of the transfer control signal comprises:

selecting a first voltage level as the first final activation level, responsive to the maximum sampling value being less than the first reference value;

selecting a second voltage level as the first final activation level responsive to the maximum sampling value being equal to or greater than the first reference value and less than the second reference value; and selecting a third voltage level as the first final activation level responsive to the maximum sampling value being equal to or greater than the second reference value, and wherein the second voltage level is less than the first voltage level and is greater than the third voltage level.

10. The method according to claim 8, further comprising:

applying a photo control signal to a photo gate that is formed over a photo detection region of the depth pixel, wherein obtaining the plurality of sampling values comprises obtaining the plurality of sampling values by sampling the reception light responsive to the transfer control signal having the first initial activation level and the photo control signal having a second initial activation level; and determining a second final activation level of the photo control signal based on the plurality of sampling values and the at least one reference value, wherein the distance between the depth pixel and the object is calculated based on the reception light, the transfer control signal having the first final activation level and the photo control signal having the second final activation level, and wherein determining the second final activation level of the photo control signal comprises:

selecting a maximum sampling value of the plurality of sampling values; and selecting the second final activation level of the photo control signal by comparing the maximum sampling value with the at least one reference value.

11. The method according to claim 8, wherein the depth pixel further includes a photo gate formed over the photo detection region, a photo control signal being applied to the photo gate, wherein the plurality of sampling values are obtained by sampling the reception light based on the transfer control signal having the first initial activation level and the photo control signal having a second initial activation level, the method further comprising:

determining a second final activation level of the photo control signal based on the plurality of sampling values and the at least one reference value, and wherein the distance between the depth pixel and the object is calculated based on the reception light, the transfer control signal having the first final activation level and the photo control signal having the second final activation level.

12. The method according to claim 11, wherein determining the second final activation level of the photo control signal comprises:

selecting a maximum sampling value of the plurality of sampling values; and selecting the second final activation level of the photo control signal by comparing the maximum sampling value with the at least one reference value.

13. The method according to claim 12, wherein the at least one reference value includes a first reference value and a second reference value, and wherein selecting the second final activation level of the photo control signal comprises:

when the maximum sampling value is less than the first reference value, selecting a first voltage level as the second final activation level;

when the maximum sampling value is equal to or greater than the first reference value and is less than the second reference value, selecting a second voltage level as the second final activation level; and when the maximum sampling value is equal to or greater than the second reference value, selecting a third voltage level as the second final activation level.

14. The method according to claim 13, wherein the second voltage level is greater than the first voltage level and is less than the third voltage level.

15. The method according to claim 12, wherein the at least one reference value includes a first reference value and a second reference value, and wherein selecting the second final activation level of the photo control signal comprises:

when the maximum sampling value is less than the first reference value, selecting a first voltage level as the second final activation level;

when the maximum sampling value is equal to or greater than the first reference value, updating the maximum sampling value based on a second voltage level;

when the updated maximum sampling value is less than the second reference value, selecting the second voltage level as the second final activation level; and when the updated maximum sampling value is equal to or greater than the second reference value, selecting a third voltage level as the second final activation level.

16. The method according to claim 11, wherein the depth pixel further includes a bridge diffusion node formed adjacent the photo detection region.

17. The method according to claim 11, wherein the depth pixel further includes a storage node and a storage gate, the storage node being formed between the photo detection region and the floating diffusion region, the storage gate being formed between the photo gate and the transfer gate, a storage control signal being applied to the storage gate, wherein the plurality of sampling values are obtained by sampling the reception light based on the transfer control signal having the first initial activation level, the photo control signal having the second initial activation level and the storage control signal having a third initial activation level, the method further comprising:

determining a third final activation level of the storage control signal based on the plurality of sampling values and the at least one reference value, wherein the distance between the depth pixel and the object is calculated based on the reception light, the transfer control signal having the first final activation level, the photo control signal having the second final activation level and the storage control signal having the third final activation level.

18. The method according to claim 17, wherein determining the third final activation level of the storage control signal includes:

selecting a maximum sampling value of the plurality of sampling values; and selecting the third final activation level of the storage control signal by comparing the maximum sampling value with the at least one reference value.

19. The method according to claim 18, wherein the at least one reference value includes a first reference value and a second reference value, and wherein selecting the third final activation level of the storage control signal comprises:

when the maximum sampling value is less than the first reference value, selecting a first voltage level as the third final activation level;

when the maximum sampling value is equal to or greater than the first reference value and is less than the second reference value, selecting a second voltage level as the third final activation level; and when the maximum sampling value is equal to or greater than the second reference value, selecting a third voltage level as the third final activation level.

20. A method of operating a three-dimensional (3D) image sensor including a plurality of depth pixels, the method comprising:

obtaining a first distance between a first depth pixel of the plurality of depth pixels and an object based on a reception light reflected by the object;

obtaining a second distance between a second depth pixel of the plurality of depth pixels and the object based on the reception light; and generating a 3D image based on the first distance and the second distance, wherein the first depth pixel includes a first photo detection region, a first transfer gate and a first floating diffusion region, wherein obtaining the first distance includes:

obtaining a plurality of sampling values by sampling the reception light based on a first transfer control signal having a first initial activation level, the first transfer control signal being applied to the first transfer gate;

determining a first final activation level of the first transfer control signal based on the plurality of sampling values and at least one reference value; and calculating the first distance based on the reception light and the first transfer control signal having the first final activation level.

* * * * *